US008564402B2

(12) United States Patent
Saotome

(10) Patent No.: US 8,564,402 B2
(45) Date of Patent: Oct. 22, 2013

(54) LOCK SYSTEM, UNLOCK DEVICE, APPARATUS, PORTABLE TERMINAL DEVICE, UNLOCK METHOD, UNLOCK PROGRAM, AND CIRCUIT DEVICE

(75) Inventor: Makoto Saotome, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1415 days.

(21) Appl. No.: 11/678,751

(22) Filed: Feb. 26, 2007

(65) Prior Publication Data

US 2007/0229221 A1 Oct. 4, 2007

(30) Foreign Application Priority Data

Mar. 7, 2006 (JP) ................................. 2006-061207
Dec. 19, 2006 (JP) ................................. 2006-340965

(51) Int. Cl.
*G08C 19/00* (2006.01)
(52) U.S. Cl.
USPC ......... 340/5.64; 340/1.1; 340/5.61; 340/5.62; 380/247; 380/35; 455/411
(58) Field of Classification Search
USPC .................. 340/5.64, 5.6, 5.2, 5.1, 825, 5.72; 341/176
See application file for complete search history.

(56) References Cited

U.S. PATENT DOCUMENTS

| | | | | |
|---|---|---|---|---|
| 4,825,210 A | * | 4/1989 | Bachhuber et al. | 340/5.31 |
| 5,781,121 A | * | 7/1998 | Kawamura | 340/5.26 |
| 6,370,200 B1 | * | 4/2002 | Takahashi | 375/257 |
| 6,438,367 B1 | * | 8/2002 | Crawford | 455/410 |
| 6,456,976 B1 | | 9/2002 | Kuita | |
| 7,063,400 B2 | * | 6/2006 | Du et al. | 347/9 |
| 7,603,511 B2 | * | 10/2009 | Rybak et al. | 711/103 |
| 7,668,556 B2 | | 2/2010 | Yokoshi et al. | |
| 2001/0015694 A1 | * | 8/2001 | Lassle et al. | 340/5.26 |
| 2001/0043659 A1 | * | 11/2001 | Kurozumi et al. | 375/340 |
| 2003/0086387 A1 | * | 5/2003 | Matsui et al. | 370/324 |

(Continued)

FOREIGN PATENT DOCUMENTS

JP 07075184 A * 3/1995
JP 07-267048 A 10/1995

(Continued)

OTHER PUBLICATIONS

Japanese Notification of Reason(s) for Refusal, Partial English-language translation, mailed Oct. 26, 2010, from Japanese Patent Office for corresponding Japanese Application No. 2006-340965, pp. 1-6.

(Continued)

*Primary Examiner* — George Bugg
*Assistant Examiner* — Naomi Small
(74) *Attorney, Agent, or Firm* — Fujitsu Patent Center

(57) ABSTRACT

A lock system that unlocks a lock with an unlock signal, prevents malfunction of locking or unlocking, and reduces power consumption of a receiving unit side that receives the unlock signal. The lock system avoids radio wave interference of the unlock signal and prevents malfunction of locking or unlocking by providing irregularity in a transmission timing of the unlock signal to a device that unlocks a lock with the unlock signal. In regard to a reception of the unlock signal, the lock system sets a receiving window by setting a reception-ON time and a reception-OFF time, and by stopping an operation of the receiving unit except during the reception-ON time, reduction of power consumption can be achieved.

17 Claims, 30 Drawing Sheets

(56) References Cited

U.S. PATENT DOCUMENTS

| | | |
|---|---|---|
| 2003/0139878 A1* | 7/2003 | DeLuca et al. ............... 701/213 |
| 2004/0203384 A1* | 10/2004 | Sugikawa et al. ............ 455/41.2 |
| 2004/0239484 A1* | 12/2004 | Hata .......................... 340/5.72 |
| 2006/0003788 A1 | 1/2006 | Yokoshi et al. |
| 2006/0217063 A1* | 9/2006 | Parthasarathy ................ 455/39 |

FOREIGN PATENT DOCUMENTS

| | | | |
|---|---|---|---|
| JP | 09-064967 | | 3/1997 |
| JP | 09064967 A | * | 3/1997 |
| JP | 09-098488 | | 4/1997 |
| JP | 2000-165511 | | 6/2000 |
| JP | 2001144789 A | * | 5/2001 |
| JP | 2001160189 A | * | 6/2001 |
| JP | 2001-245354 | | 9/2001 |
| JP | 2003-184377 A | | 7/2003 |
| JP | 2003-289307 | | 10/2003 |
| JP | 2004-013572 A | | 1/2004 |
| JP | 2006-020003 A | | 1/2006 |

OTHER PUBLICATIONS

Partial English-language Translation of JP-2001-144789-A.
Partial English-language Translation of JP-09-064967-A.

* cited by examiner

LOCK SYSTEM, UNLOCK DEVICE, APPARATUS, PORTABLE TERMINAL DEVICE, UNLOCK METHOD, UNLOCK PROGRAM, AND CIRCUIT DEVICE

CROSS-REFERENCE TO RELATED APPLICATIONS

This application is based upon and claims the benefit of priority from the prior Japanese Patent Application No. 2006-061207, filed on Mar. 7, 2006, and the prior Japanese Patent Application No. 2006-340965, filed on Dec. 19, 2006, the entire contents of which are incorporated herein by reference.

BACKGROUND OF THE INVENTION

1. Field of the Invention

The present invention relates to a lock system that locks and unlocks functions of various apparatuses such as a cellular phone, and the present invention particularly relates to a lock system, an unlock device, various apparatuses such as a portable terminal device, an unlock method, an unlock program, and a circuit device that unlock a lock with an unlock signal.

2. Description of the Related Art

Measures are taken by installing a dial lock function to a cellular phone to prevent an unauthorized use by someone else and to retain confidentiality such as directory data of the phone. When the dial lock is set, the dial lock function requires such an operation as password inputting and prevents unlocking by someone else.

The lock functions are disclosed in Japanese Patent Application Laid-Open Publication Nos. 2001-245354, 2000-165511, 2003-289307, H09(1997)-98488, and H09(1997)-64967. In Japanese Patent Application Laid-Open Publication No. 2001-245354, a cellular phone transmits an unlock code to an unlock device by a weak electric wave. The unlock device transmits to the cellular phone a result of identification calculation conducted with the unlock code and ID information, and locked state of the cellular phone is unlocked based on the result of the identification calculation.

In Japanese Patent Application Laid-Open Publication No. 2000-165511, a voice recognition function is installed on a cellular phone, and the cellular phone recognizes a user's voice signal from a distant place and sets or unlocks a dial lock.

In Japanese Patent Application Laid-Open Publication No. 2003-289307, communications among apparatuses within a communication range is allowed, and when any one of the apparatuses deviates from the communication range, communications of all the apparatuses are automatically locked. When the apparatus out of the communication range comes back to the communication range, communications of the apparatuses are unlocked.

In Japanese Patent Application Laid-Open Publication No. H09 (1997)-98488 a cellular phone receives lock control information that is transmitted externally by an infrared ray. The cellular phone locks or unlocks a lock based on a situation judgment of the cellular phone and the lock control information.

In Japanese Patent Application Laid-Open Publication No. H09 (1997)-6496V, an unlock device dial-locks or unlocks a cellular phone. After unlocking, when the cellular phone cannot receive a code from the unlock device for a certain time, dial lock is set.

As mentioned above, a lock system uses a wireless signal to set a lock or unlock of apparatuses such as a cellular phone. However, when communications of the same time cycle or wireless signals of the same frequency are conducted, a plurality of wireless signals travel among adjacent people at workplaces and offices or in trains, etc. Communications may become impossible as a result of electromagnetic interference such as radio wave interference, and wireless signals may not be received correctly. It is inconvenient that locking and unlocking are unable to be conducted.

No disclosures or suggestions of the problem are provided in Japanese Patent Application Laid-Open Publication Nos. 2001-245354, 2000-165511, 2003-289307, H09 (1997)-98488, and H09 (1997)-64967, and no configurations to solve the problem are disclosed or suggested.

SUMMARY OF THE INVENTION

A first object of the present invention is to prevent malfunction in locking or unlocking, in regard to the lock system that unlocks a lock with the unlock signal.

A second object of the present invention is to reduce power consumption of the receiving unit that receives the unlock signal in regard to the lock system that unlocks a lock with the unlock signal.

To achieve the first object, the present invention avoids radio wave interference of an unlock signal by providing irregularity to a transmission timing of the unlock signal of an apparatus that unlocks a lock with the unlock signal, and prevents malfunction in locking or unlocking. To achieve the second object in regard to receiving the unlock signal, the present invention sets a receiving window by setting a reception-ON time and a reception-OFF time, and achieves reduction of power consumption by inactivating a receiving unit at times other than the reception-ON time.

To achieve the first object, a first aspect of the present invention is a lock system that unlocks a lock with an unlock signal comprising a transmitting unit that transmits the unlock signal having irregularity in a transmission timing; and an unlocking unit that unlocks a lock in case where the unlocking unit receives the unlock signal transmitted from the transmitting unit within a predetermined time. According to the configuration of the present invention, the transmission timing of the unlock signal has irregularity. Therefore, radio wave interference of a plurality of the unlock signals can be avoided, reception accuracy of the unlock signals improves, and malfunction can be prevented, and as a result, the first object can be achieved.

To achieve the first object, preferably, the lock system comprises a receiving unit that receives the unlock signal, wherein a reception-ON time and a reception-OFF time of the unlock signal are set at the receiving unit, and wherein power feeding to the receiving unit is stopped during the reception-OFF time. Preferably, in the lock system, the transmitting unit transmits unlock signals by varying frequencies of the unlock signals to be transmitted. Preferably, the lock system comprises a switch that transmits the unlock signal, wherein upon receiving operation of the switch the transmitting unit transmits the unlock signal.

To achieve the first object, a second aspect of the present invention is an unlock device that transmits an unlock signal to an apparatus that is in an unlocked state comprising a transmitting unit that transmits the unlock signal having irregularity in a transmission timing.

To achieve the first object, preferably, the unlock device comprises a storage unit that stores an unlock code; a reference time-cycle generating unit that generates a reference time-cycle signal; and an irregularity information generating unit that generates irregularity information, wherein the unlock signal having irregularity in the transmission timing is transmitted, the irregularity being provided by the unlock code read from the storage unit, the reference time-cycle signal generated by the reference time-cycle generating unit and the irregularity information generated by the irregularity information generating unit. Preferably, in the unlock device, the irregularity provided with the unlock signal is set by using a random number.

To achieve the first object, preferably, in the unlock device, the transmitting unit transmits unlock signals by varying frequencies of the unlock signals to be transmitted.

To achieve the first object, preferably, the unlock device comprises a switch that transmits the unlock signal, wherein upon receiving operation of the switch the transmitting unit transmits the unlock signal.

To achieve the second object, a third aspect of the present invention is an apparatus that is controlled to be in a locked state in case where an unlock signal cannot be received during a predetermined period, the apparatus comprising a receiving unit that receives the unlock signal; and a reception controlling unit that sets a reception-ON time and a reception-OFF time of the unlock signal at the receiving unit, and stops an operation of the receiving unit during the reception-OFF time. Also, according to the configuration of the present invention, the reception-OFF time that stops reception of the unlock signals is set, and as a result reduction of power consumption can be achieved.

To achieve the second object, preferably, in the apparatus, the reception controlling unit stops feeding power to the receiving unit during the reception-OFF time.

To achieve the second object, a fourth aspect of the present invention is a portable terminal device that is controlled to be in a locked state in case where an unlock signal cannot be received during a predetermined period, the device comprising a receiving unit that receives the unlock signal; and a reception controlling unit that sets a reception-ON time and a reception-OFF time of the unlock signal at the receiving unit, and stops an operation of the receiving unit during the reception-OFF time.

To achieve the second object, preferably, in the portable terminal device, the reception controlling unit stops feeding power to the receiving unit during reception-OFF time.

To achieve the first object, a fifth aspect of the present invention is an unlock method that unlocks a lock of an apparatus that is in a locked state with an unlock signal comprising a process that transmits the unlock signal having irregularity in a transmission timing.

To achieve the first object, preferably, the unlock method comprises a process of reading an unlock code from a storage unit; a process of generating a reference time-cycle signal; a process of generating irregularity information; and a process of transmitting the unlock signal having irregularity in the transmission timing, the irregularity being provided by the unlock code read from the storage unit, the reference time-cycle signal and the irregularity information. Preferably, the unlock method comprises a process of transmitting unlock signals by varying frequencies of the unlock signals. Preferably, the unlock method comprises a process of transmitting the unlock signal upon receiving operation of a switch.

To achieve the second object, a sixth aspect of the present invention is an unlock method that controls an apparatus to be in a locked state in case where an unlock signal cannot be received in a predetermined period, the method comprising a process of receiving an unlock signal; and a process of setting a receiving window for the unlock signal and of unlocking the locked state with the unlock signal received by the receiving window.

To achieve the second object, preferably, the unlock method comprises a process of stopping power feeding during a period other than a reception-ON time of an unlock signal.

To achieve the first object, a seventh aspect of the present invention is an unlock program that is executed by a computer and unlocks a lock of an apparatus in a locked state with an unlock signal, the program comprising a step of transmitting the unlock signal having irregularity in a transmission timing.

To achieve the first object, preferably, the unlock program comprises a step of reading an unlock code from a storage unit; a step of generating a reference time-cycle signal; a step of generating irregularity information; and a step of transmitting the unlock signal having irregularity in a transmission timing, the irregularity being provided by the unlock code read from the storage unit, the reference time-cycle signal and the irregularity information.

To achieve the second object, an eighth aspect of the present invention is an unlock program that is executed by a computer and controls an apparatus to be in a locked state in case where an unlock signal cannot be received in a predetermined period, the program comprising a step of taking in a received unlock signal; a step of setting a reception-ON time and a reception-OFF time of the unlock signal and of unlocking the locked state with the unlock signal that is received during the reception-ON time.

To achieve the second object, preferably, the unlock program comprises a program that stops power feeding during the reception-OFF time of the unlock signal. Preferably, in the unlock program, the apparatus is a cellular phone.

To achieve the first object, a ninth aspect of the present invention is a circuit device installed in an unlock device that transmits an unlock signal to an apparatus in a locked state, the circuit device comprising on the circuit board thereof a transmitting unit that transmits an unlock signal having irregularity in a transmission timing.

To achieve the first object, preferably, the circuit device comprises on the circuit board thereof a storage unit that stores an unlock code; a reference time-cycle generating unit that generates a reference time-cycle signal; an irregularity information generating unit that generates irregularity information; and a transmitting unit that transmits the unlock signal having irregularity in a transmission timing provided by the unlock code read from the storage unit, the reference time-cycle signal generated by the reference time-cycle generating unit, and the irregularity information generated by the irregularity information generating unit.

To achieve the second object, a tenth aspect of the present invention is a circuit device installed on an apparatus that is controlled to be in a locked state in case where an unlock signal cannot be received in a predetermined period, the device comprising on a circuit board thereof a receiving unit that receives the unlock signal; and a reception controlling unit that sets a reception-ON time and a reception-OFF time of the unlock signal at the receiving unit and stops an operation of the receiving unit during the reception-OFF time.

Aspects and advantages of the present invention are as follows.

(1) Since devices are unlocked with transmission of the unlock signal having irregularity in the transmission timing, failures such as radio wave interference of the unlock signal can be overcome, and therefore malfunction in locking and unlocking can be prevented.

(2) Since the reception-ON time and reception-OFF time of the unlock signal are set at the receiving device that receives the unlock signal and the receiving device is inactivated at the reception-OFF time, power consumption can be reduced.

The objects, aspects, and advantages of the present invention will become more apparent by referring to attached drawings and embodiments.

DETAILED DESCRIPTION OF THE PREFERRED EMBODIMENTS

First Embodiment

Figure 1:
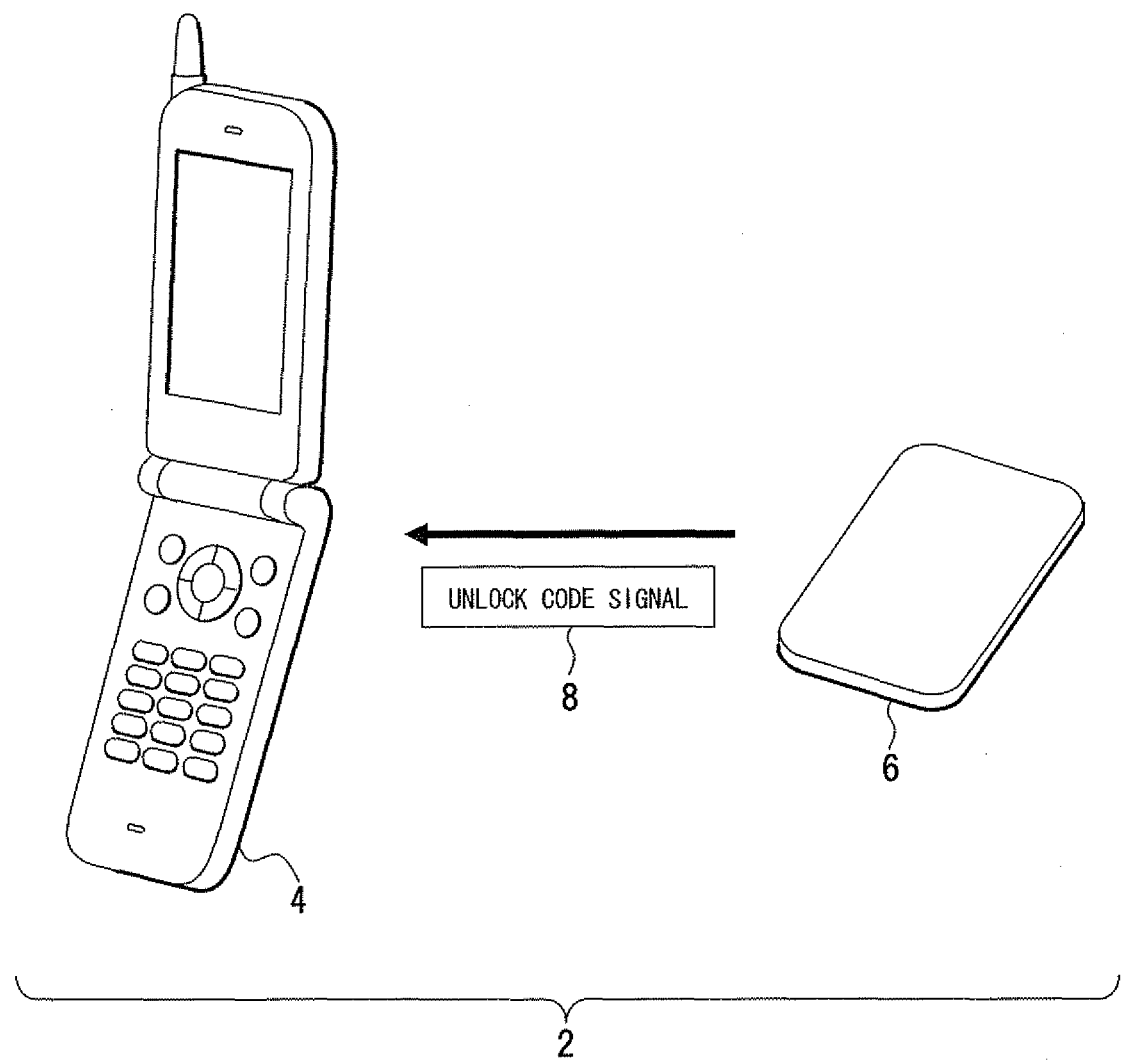
FIG. 1 is a view of a lock system of a cellular phone according to a first embodiment.
Figure 2:
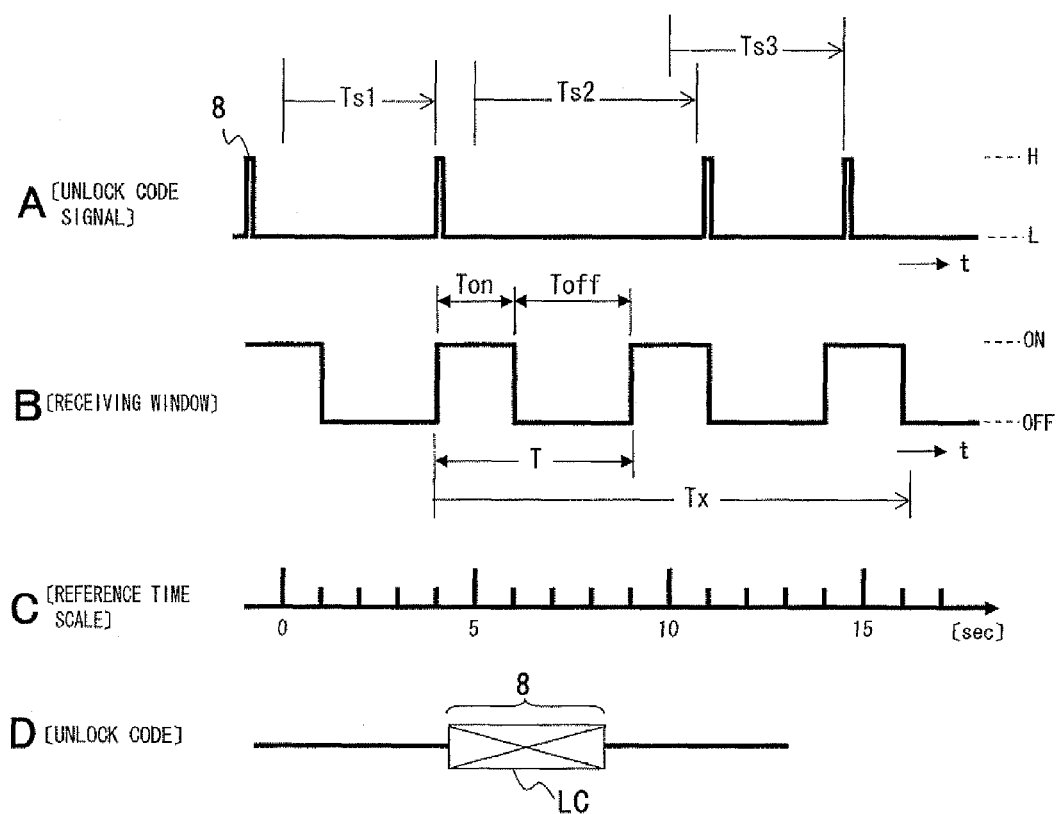
FIG. 2 is a timing chart of an unlock code signal and a receiving window.

A first embodiment of the present invention will be described referring to FIGS. 1 and 2. FIG. 1 is a view of a lock system of a cellular phone. FIG. 2 is a view of a timing chart of an unlocking operation. In FIGS. 1 and 2, the same parts are identified by the same reference numerals.

As shown in FIG. 1, the lock system 2 includes controlling functions such as a dial lock function. The lock system 2 includes a cellular phone 4 and an unlock device 6 as examples of apparatuses that are unlocked by unlock signals. The lock system 2 sends an unlock code signal 8 as an unlock signal from the unlock device 6, and the cellular phone 4 receives the unlock code signal. In the lock system 2, irregularity is provided to a transmission timing of the unlock code signal 8, and a reception-ON time Ton as a receiving window that can receive the unlock code signal 8 and a reception-OFF time Toff that stops the reception of the unlock code signal 8 are set on the cellular phone 4. In the lock system 2, the cellular phone 4 constitutes an unlocking unit that unlocks a lock with the unlock signal, and the unlock device 6 constitutes a transmission unit that transmits the unlock signal.

In the lock system 2, as shown in FIG. 2A, the unlock code signal 8 having the transmission timing Ts1, Ts2, Ts3 . . . (Ts1≠Ts2≠Ts3 . . . ) that is irregular compared to a reference timing is transmitted discontinuously from the unlock device 6. As shown in FIG. 2B, the reception-ON time Ton and the reception-OFF time Toff are set at a constant time cycle T as a receiving window that receives the unlock code signal 8 on the cellular phone 4 side. Since the reception-ON time Ton is a time that the receiving window can receive the unlock code signal 8, the reception-ON time Ton is set at a longer duration than that of the unlock code signal 8. A duration of the time cycle T is set at a duration of the unlock code signal 8 reaching the receiving window, for example. FIG. 2C is a reference time scale showing the reference time. FIG. 2D is an unlock code LC that is included in the unlock code signal 8, and the unlock code LC is a password, etc., that a user sets.

In the lock system 2, since the transmission timing of the unlock code signal 8 has irregularity, the lock system 2 prevents failures and malfunction caused by, for example, radio wave interference between the unlock code signal 8 toward the cellular phone 4 and an unlock code signal toward an adjacent apparatus. As a result, reliability of the lock function is maintained.

On the cellular phone 4 side, since the reception-ON time Ton as a receiving window that receives the set unlock code signal 8 and the reception-OFF time Toff that stops the reception are set, the reception-OFF time Toff reduces power consumption. In this case, if power feeding is stopped at the reception-OFF time Toff, battery consumption of a power source can be reduced.

The cellular phone 4 is switched to a locked state after a constant time period Tx (for example, Tx of FIG. 2B) when a distance between the cellular phone 4 and the unlock device 6 is a certain range, i.e., when the cellular phone 4 cannot receive the unlock code signal 8 that is a weak wireless signal transmitted from the unlock device 6. A starting point of a timekeeping of the constant time period Tx can be any of the points that the reception-ON time Ton of the receiving window switches to the reception-OFF time Toff or points that the reception-OFF time Toff switches to the reception-ON time Ton, etc.

As just described, when the unlock code signal 8 does not reach the cellular phone 4, the functions of the cellular phone 4 are locked after the constant time period Tx, therefore the user is protected from unauthorized use caused by a loss and theft of the cellular phone 4.

Second Embodiment

Figure 3:
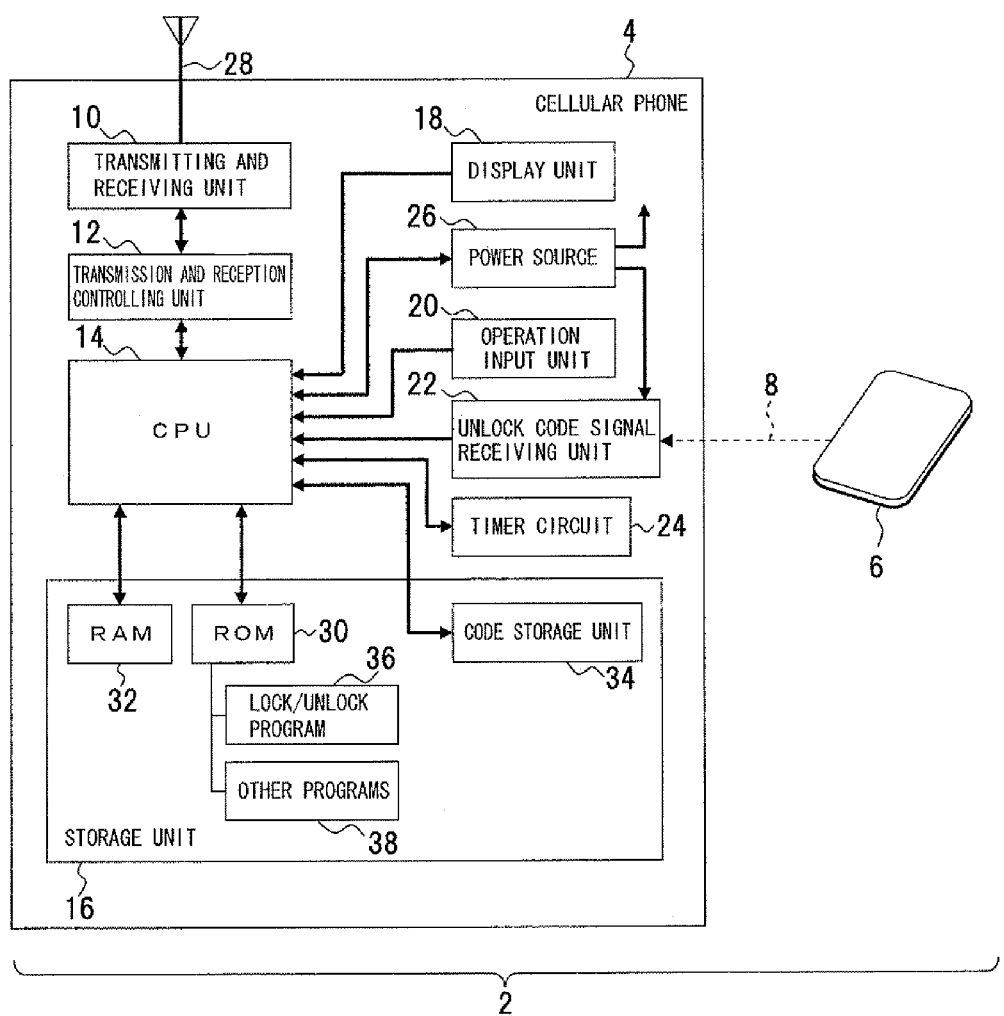
FIG. 3 is a view of an example of a cellular phone of a lock system according to a second embodiment.
Figure 4:
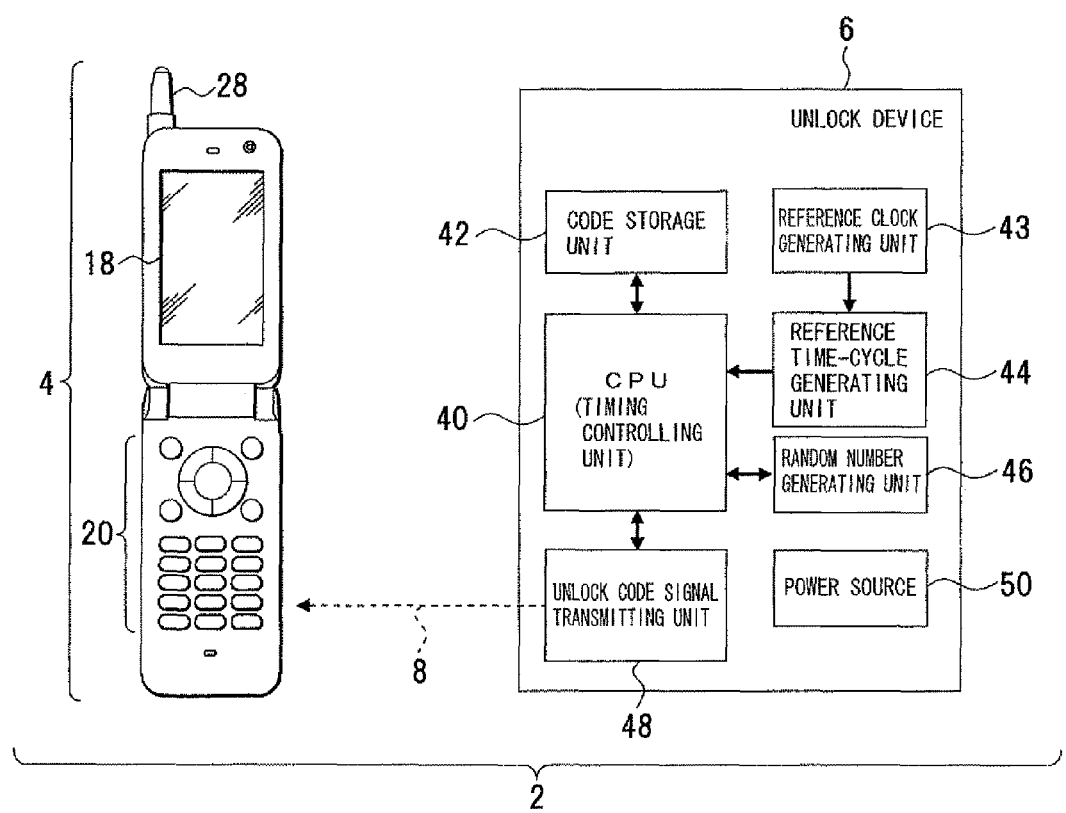
FIG. 4 is a view of an example of an unlock device of the lock system according to the second embodiment.

A second embodiment of the present invention will be described referring to FIGS. 3 and 4. FIG. 3 is a view of an example of a configuration of a cellular phone, and FIG. 4 is a view of an example of a configuration of an unlock device. In FIGS. 3 and 4, the same parts in FIGS. 1 and 2 are identified by the same reference numerals.

As shown in FIG. 3, the cellular phone 4 is configured with computers and includes a transmitting and receiving unit 10, a transmission and reception controlling unit 12, CPU (Central Processing Unit) 14, a storage unit 16, a display unit 18, an operation input unit 20, an unlock code signal receiving unit 22, a timer circuit 24, a power source 26, etc.

The transmitting and receiving unit 10 includes an antenna 28, and with control by the CPU 14, transmits and receives by a voice signal and such a wireless signal as packet data including e-mail, etc. The transmission and reception controlling unit 12, with control by the CPU 14, modulates to superimpose the voice signal and a packet data signal to a carrier wave, demodulates to reproduce the voice signal and the packet data signal from the wireless signal, and executes other operations.

The CPU 14 executes a program stored in the storage unit 16, controls a call, controls locking, controls unlocking, etc. The lock controlling is an operation that locks the cellular phone 4 with an input setting of the operation input unit 20, monitors a time with the timer circuit 24, and controls functions other than the unlock code signal 8 such as the dial lock when the cellular phone 4 cannot receive the unlock code signal 8 for the constant time cycle or longer. The unlock controlling is an operation that unlocks the cellular phone 4 with an input from the operation input unit 20 and maintains an unlocked state by detecting the unlock code signal 8. The CPU 14 monitors power feeding of the power source 26, and when the unlock code signal 8 cannot be received, stops power feeding to units other than unlock functional units such as the CPU 14 and the unlock code signal receiving unit 22.

The storage unit 16 is a storage medium that stores programs, code, etc., and includes a ROM (Read-Only Memory) 30, a RAM (Random-Access Memory) 32, a code storage unit 34, etc. The ROM 30 stores a lock/unlock program 36 and other programs 38. The lock/unlock program 36 executes locking by a setting from the operation input unit 20, executes locking when the unlock code signal 8 cannot be received, etc. The lock/unlock program 36 is used for a process of unlocking when the unlock code signal 8 arrives and corresponds to the unlock code stored in the code storage unit 34. The RAM 32 is used as a work area, and the code storage unit 34 consists of a nonvolatile memory, etc., and stores the unlock code.

The display unit 18 consists of an LCD (Liquid Crystal Display), for example, and displays an operational state and input information of the operation input unit 20. The operation input unit 20 consists of a keyboard, for example, and includes a symbol key, a cursor key, a decision key, etc.

The unlock code signal receiving unit 22 receives the unlock code signal 8 that is a wireless signal transmitted from the unlock device 6, detects the unlock code from the unlock code signal 8, and inputs to the CPU 14.

The timer circuit 24 counts the time cycle T of the receiving window, the reception-ON time Ton, the reception-OFF time Toff, the constant time period Tx for monitoring arrival of the unlock code signal 8, etc.

The power source 26 consists of batteries, etc., and is controlled by the CPU 14 so as to stop feeding power to the unlock code signal receiving unit 22 during the period other than the receiving window period of the unlock code signal receiving unit 22, e.g., during the reception-OFF time Toff of the set reception-ON time Ton and reception-OFF time Toff.

As shown in FIG. 4, the unlock device 6 consists of a CPU 40, a code storage unit 42, a reference clock generating unit 43, a reference time-cycle generating unit 44, a random number generating unit 46, an unlock code signal transmitting unit 48, and a power source 50, and forms a shape of a card that is easy to carry.

The CPU 40 is a timing controlling unit that controls a generation timing of the unlock code, and reads the unlock code from the code storage unit 42 and sends the unlock code signal 8 having an irregular transmission timing in terms of time. The transmission timing is irregular since irregularity is added to the unlock code by providing a time deviation, provided by a random number value from the random number generating unit 46, to a reference time-cycle signal that the reference time-cycle generating unit 44 generated with a reference clock of a reference clock generating unit 43.

The code storage unit 42 consists of a nonvolatile memory, for example, and stores an unlock code that corresponds to the unlock code of the cellular phone 4. The reference time-cycle generating unit 44 generates the reference time-cycle signal, and the random number generating unit 46 generates the random numbers. The unlock code signal transmitting unit 48 superimposes the unlock code signal 8 having irregularity to a weak electric wave, and transmits to the cellular phone 4 side by the wireless signal. The power source 50 consists of batteries, for example.

Figure 5:
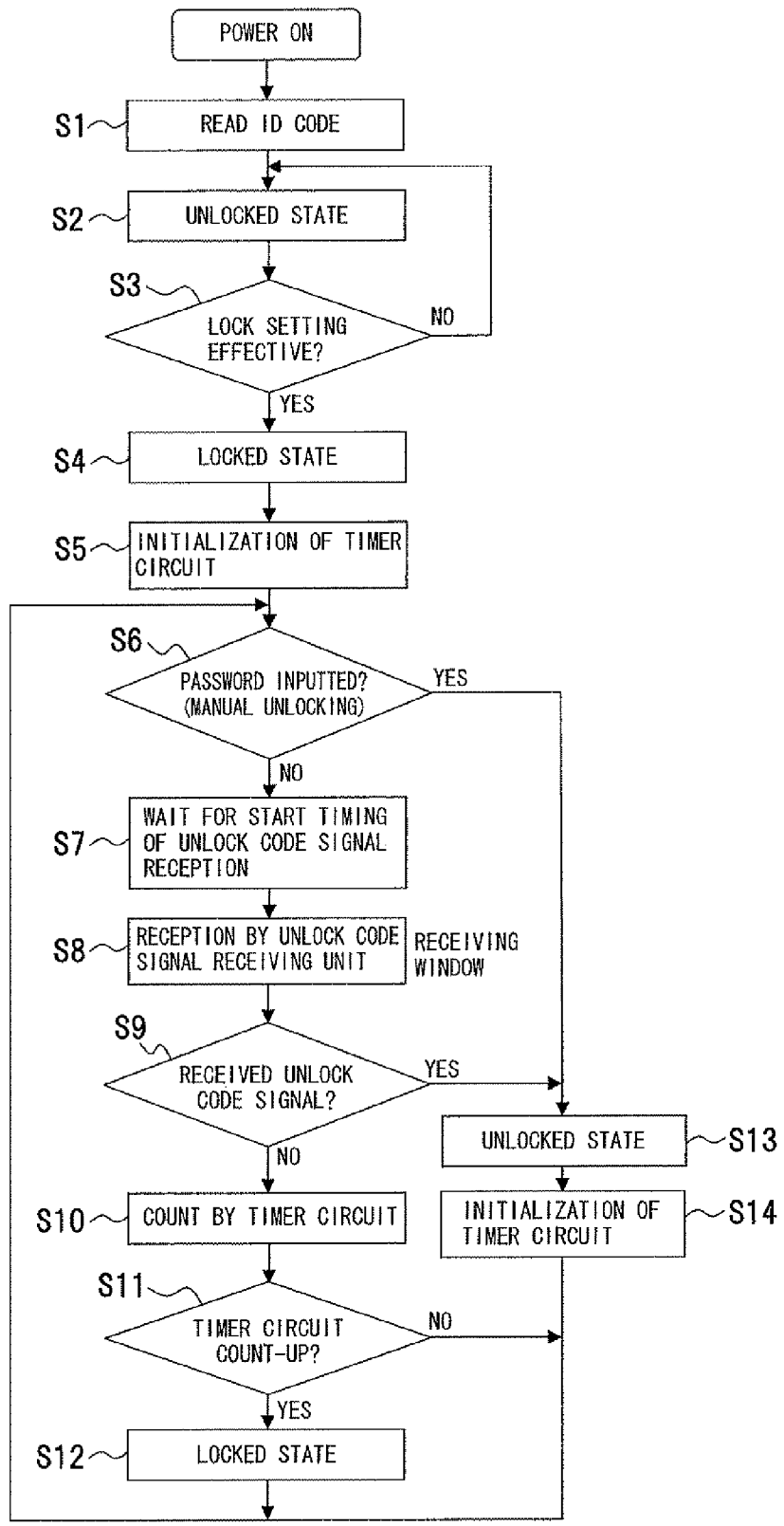
FIG. 5 is a flow chart of an operation of the cellular phone.
Figure 6:
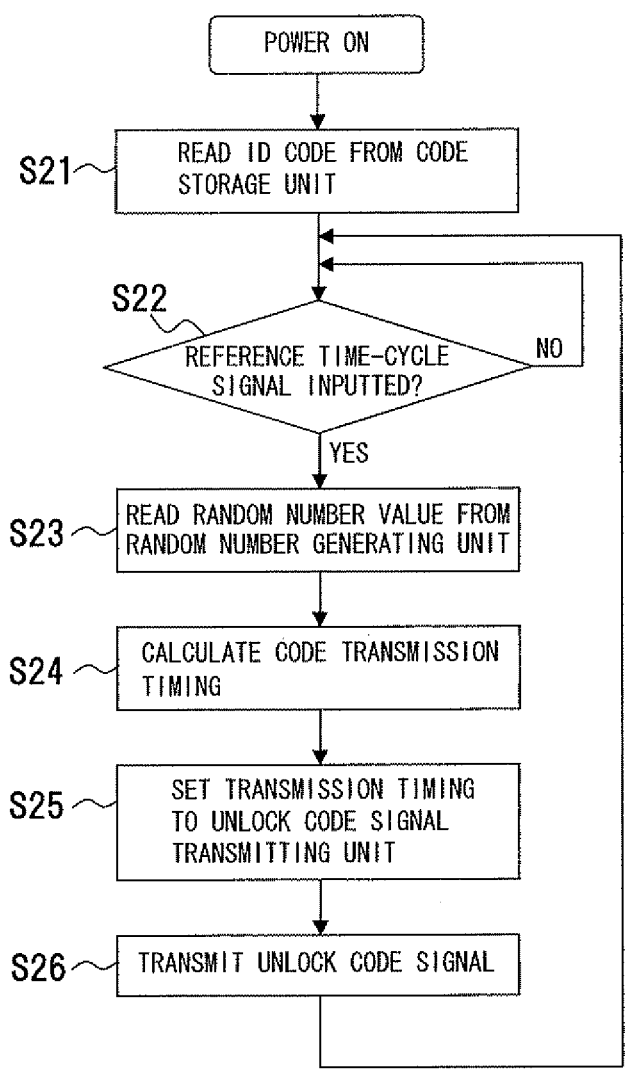
FIG. 6 is a flow chart of an operation of the unlock device.

An operation of the unlock system 2 will be explained referring to FIGS. 5 and 6. FIG. 5 is a flow chart of an operation program of the cellular phone 4, and FIG. 6 is a flow chart of an operation program of the unlock device 6.

As shown in FIG. 5, when a power source is connected to the cellular phone 4, the lock/unlock program 36 starts, and an ID code is read from the code storage unit 34 (step S1) and the cellular phone 4 becomes an unlocked state (step S2). From the unlocked state, whether a lock setting is effectively conducted is determined (step S3). When the lock setting is ineffective (step S3 NO), the unlocked state is maintained, and when the lock setting is effective (step S3 YES), the cellular phone 4 becomes a locked state (step S4). At this state, the timer circuit 24 is initialized (step S5), and whether the password is inputted is determined (step S6), and when the password is not inputted, the cellular phone 4 becomes a locked state. That is, the lock cannot be manually unlocked.

At this state, the cellular phone 4 waits to receive the unlock code signal 8, and waits for a start timing of the code reception for a constant period such as a waiting period of 0.4 second or so to elapse (step S7) After the waiting period, the unlock code signal receiving unit 22 receives the unlock code signal 8 (step S8). Whether the unlock code signal receiving unit 22 received the unlock code signal 8 is determined (step S9), and the timer circuit 24 starts counting at the beginning of the reception (step S10). Whether a predetermined time Tn, 12 seconds for example, has elapsed, e.g., whether a count-up has occurred is determined (step S11), and when the count-up has occurred, the locked state is maintained (step S12) and the procedure returns to step S6. That is to say, when the unlock code signal receiving unit 22 cannot receive the unlock code signal 8 during the predetermined time Tn, the cellular phone 4 is automatically locked.

After password inputting, if the password is correct (step S6 YES), the cellular phone 4 becomes an unlocked state (step S13), and the counting by the timer circuit 24 is initialized (step S14), and the cellular phone 4 waits for the arrival of the unlock code signal 8.

As described above, when the power source is connected to the cellular phone 4 and the correct password is inputted, the cellular phone 4 switches to the unlocked state, and when the cellular phone 4 cannot receive the unlock code signal 8 for more than the predetermined time Tn, the cellular phone 4 becomes the locked state. Therefore, the cellular phone 4 is protected from the unauthorized use caused by a theft or loss.

As shown in FIG. 6, the unlock device 6 starts operating upon power feeding. The CPU 40 reads an ID code from the code storage unit 42 (step S21), determines whether the reference time-cycle signal is inputted from the reference time-cycle generating unit 44 (step S22), and reads the random number value from the random number generating unit 46 upon arrival of the reference time-cycle signal (step S23). Using the ID code, the reference time-cycle signal, and the random number value, the CPU 40 calculates a code transmission timing., e.g., the transmission timing Ts of the unlock code signal 8 (step S24). In this case, when a random number deviation time from the random number value, as a random time deviation, is defined as +/−ΔT relative to the timing Tr of the reference time-cycle signal, the transmission timing Ts is $$Ts=Tr+/-\Delta T \qquad (1)$$

If Tr=5 [sec], and +/−ΔT=1 [sec], then a transmission time cycle changes within a range of Ts=5+/−1.

The transmission timing Ts is set at the unlock code signal transmitting unit 48 (step S25), and the unlock code signal transmitting unit 48 transmits the unlock code signal 8 at the transmission timing Ts (step S26).

Figure 7:
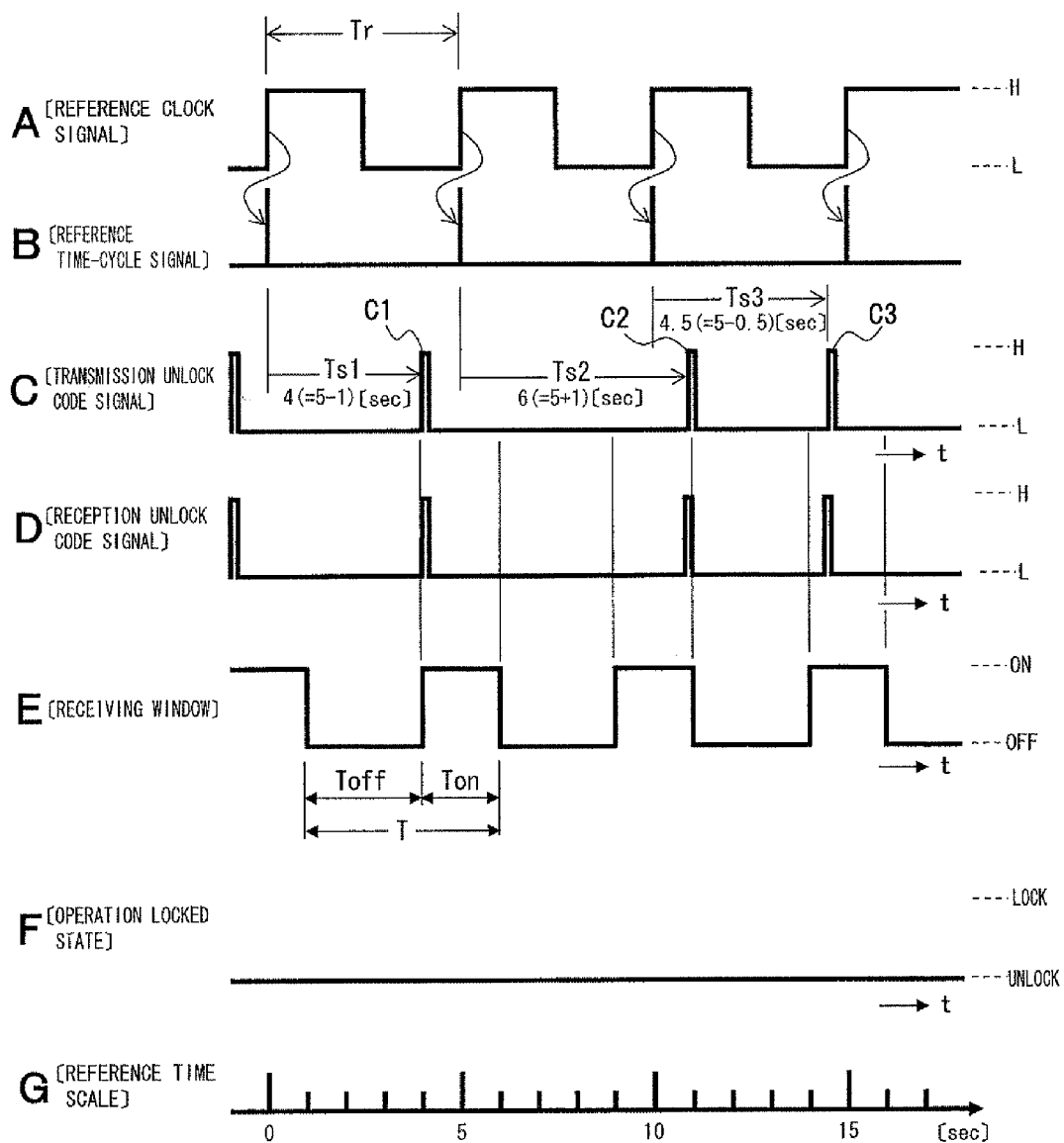
FIG. 7 is a timing chart of a generating operation of the unlock code signal.
Figure 8:
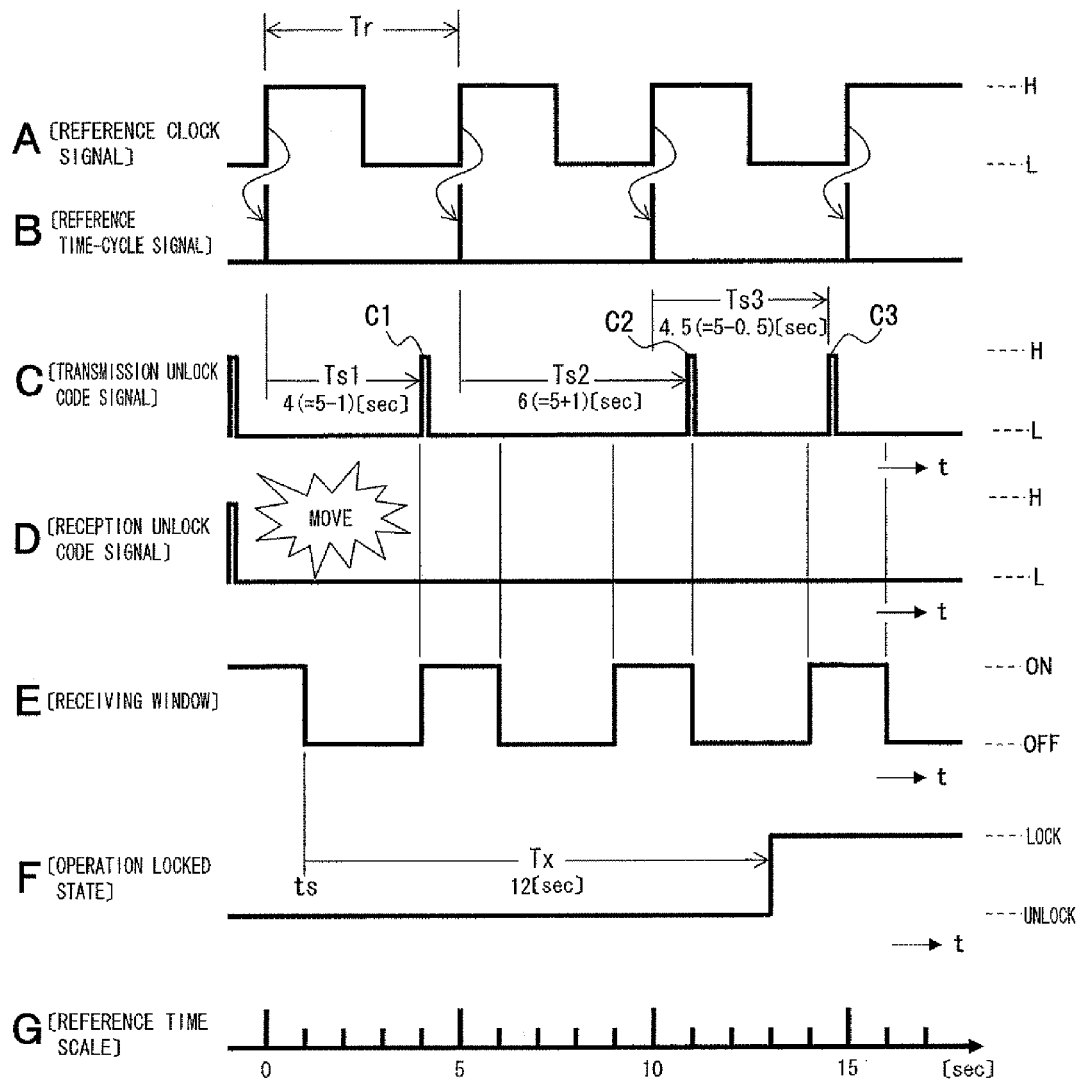
FIG. 8 is a timing chart of a generating operation of the unlock code signal.

Operations of the unlock device 6 and the cellular phone 4 will be explained referring to FIGS. 7 and 8. FIGS. 7 and 8 are timing charts of operation timings.

As shown in FIG. 7A, a reference clock signal is obtained from the reference clock generating unit 43, and the reference clock signal is added to the reference time-cycle generating unit 44. As shown in FIG. 7B, the reference time-cycle generating unit 44 generates the reference time-cycle signal that rises in synchronization with a rise of the reference clock signal Random number values from the reference time-cycle signal and the random number generating unit 46 are added to the CPU 40, and as shown in FIG. 7C, the unlock code signal 8 can be obtained. The starting point of the unlock code signal 8 is at the rise of the reference time-cycle signal, and the transmission timing Ts that is provided with the random time deviation of the above written equation 1 is generated. In this case, a transmission timing Ts1 possessed by a transmission unlock code signal C1 is, 4 [sec ](=5−1) [sec], a transmission timing Ts2 possessed by a transmission unlock code signal C2 is, 6 [sec](=5+1) [sec], and a transmission timing Ts3 possessed by a transmission unlock code signal C3 is, 4.5 [sec](=5−0.5) [sec].

As shown in FIG. 7D, the cellular phone 4 receives the unlock code signal 8 when the unlock code signal 8 provided with the transmission timing Ts that has such irregularity as mentioned above is transmitted and the cellular phone 4 exists within a distance range capable of receiving the unlock code signal 8.

As shown in FIG. 7E, the receiving window is set at the unlock code signal receiving unit 22 of the cellular phone 4. The reception-ON time Ton and the reception-OFF time Toff of the unlock code signal 8 are generated alternately at a constant time cycle, and the reception-ON time Ton is set at a time length enough to receive the unlock code signal 8.

In this case, the unlock code signal receiving unit 22 receives the unlock code signal 8, and since the unlock code detected from the unlock code signal 8 corresponds to the ID code, the cellular phone 4 is unlocked. As shown in FIG. 7F, the cellular phone 4 is in an unlocked state, e.g., an operation lock-off state, and the cellular phone 4 can be used in an ordinary manner. FIG. 7G is a reference time scale of the reference time.

As described above, when the distance between the cellular phone 4 and the unlock device 6 is within the range capable of receiving the unlock code signal 8 that is a weak wireless signal (electric wave), the cellular phone 4 is operable as shown in FIGS. 7A to 7D. When the cellular phone 4 moves away from the unlock device 6 and the distance between the two becomes larger, the cellular phone 4 becomes incapable of receiving the unlock code signal 8 as shown in FIG. 8D.

In this case, an elapsed time of the constant time period Tx is observed from a time point ts where the reception-ON time Ton switches to the reception-OFF time Toff. When the constant time period Tx has elapsed, Tx=12 [sec] for example, the cellular phone 4 switches to the locked state and stops functioning. The cellular phone 4 becomes a dial-locked state, for example.

Even if the cellular phone 4 switches to the locked state, the cellular phone 4 side can receive the unlock code signal 8 in the reception-ON time Ton, and when the distance between the cellular phone 4 and the unlock device 6 becomes within the predetermined distance, the locked state is unlocked. Even if the cellular phone 4 is in the locked state, when a user inputs an ID code such as a password, the cellular phone 4 becomes unlocked likewise, and the user can use the cellular phone 4.

Since FIGS. 8A to 8G correspond to and the same as FIGS. 7A to 7G, FIGS. 8A to 8G will not be described. In the embodiment, although the count starting point of the constant time period Tx is set at the time point where the reception-ON time Ton switches to the reception-OFF time Toff, the count starting point may be set at a time point where the reception-OFF time Toff switches to the reception-ON time Ton, or the constant time period Tx may be configured to be arbitrarily set by a user.

Third Embodiment

Figure 9:
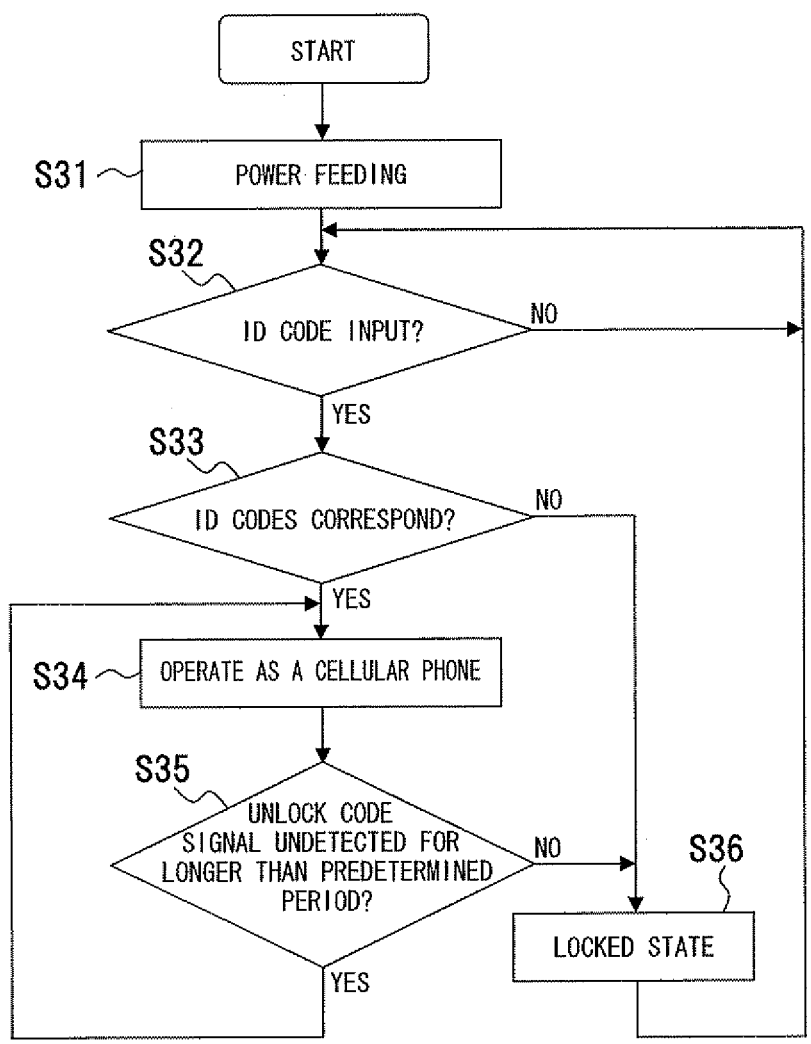
FIG. 9 is a flow chart of an operation of a cellular phone according to a third embodiment.

A third embodiment of the present invention will be described referring to FIG. 9. FIG. 9 is a flow chart of an operation of a cellular phone according to the third embodiment of the present invention.

The lock system 2 of FIG. 1, the cellular phone 4 of FIG. 3, and the unlock device 6 of FIG. 4 will also be used in the third embodiment.

In the embodiment, a power source is applied (step S31), and when the cellular phone 4 is activated, the unlock code signal receiving unit 22 becomes an operation state and an input of an ID code is determined (step S32). Whether the inputted ID code and the ID code in the code storage unit 34 correspond is determined (step S33), and when the ID codes correspond, the cellular phone 4 is unlocked and operates normally. In this case, the unlock code signal receiving unit 22 becomes an operation state (step S34).

Whether the unlock code signal 8 is undetected, as a result of the cellular phone 4 being moved away from the unlock device 6 for example, for longer than the constant time period Tx is determined (step S35), and when the unlock code signal 8 can be detected, the cellular phone 4 is normally operable, and as long as the unlock code signal 8 can be detected, the state is maintained.

When the unlock code signal 8 is undetected (step S35 NO), the cellular phone 4 switches to the locked state (step S36), and if the ID code is unauthorized (step S33 NO), the locked state is maintained. Therefore, the cellular phone 4 is protected from an unauthorized use, etc.

Fourth Embodiment

Figure 10:
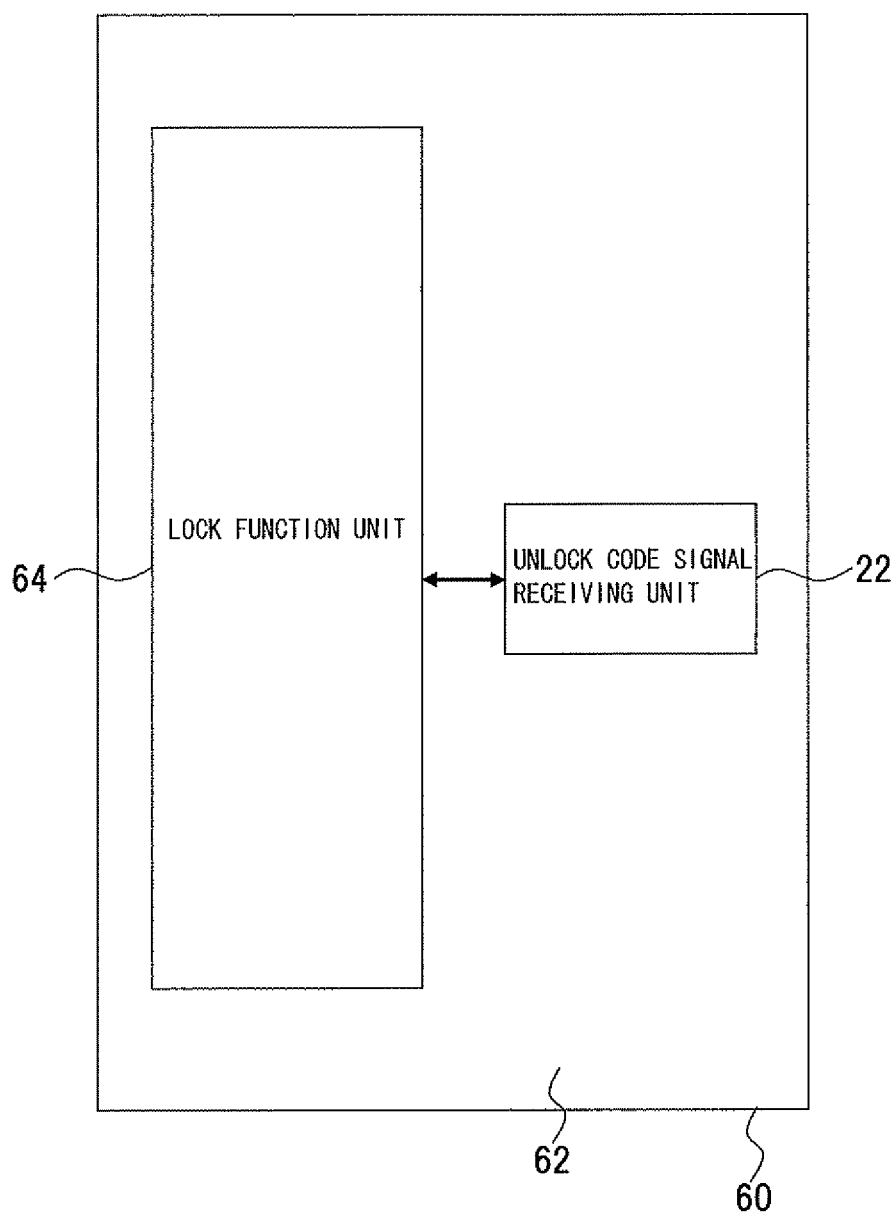
FIG. 10 is a view of a circuit device according to a fourth embodiment.

A fourth embodiment of the present invention will be described referring to the FIG. 10. FIG. 10 is a view of a circuit device that is applied to a cellular phone, etc.

As shown in FIG. 10, a circuit device 60 is a circuit board 62 with installments of a lock function unit 64 and the unlock code signal receiving unit 22 that can be applied to the cellular phone 4 (FIG. 3), etc. The lock function unit 64 includes the CPU 14 of the cellular phone 4, the ROM 30, the RAM 32, the code storage unit 34, etc., and is a controlling unit, etc., that executes the lock function or the unlock function. The unlock code signal receiving unit 22 is as described above.

By using the circuit board 62, the lock system of the cellular phone 4 and the lock system of various apparatuses that include lock functions can easily be realized.

Fifth Embodiment

Figure 11:
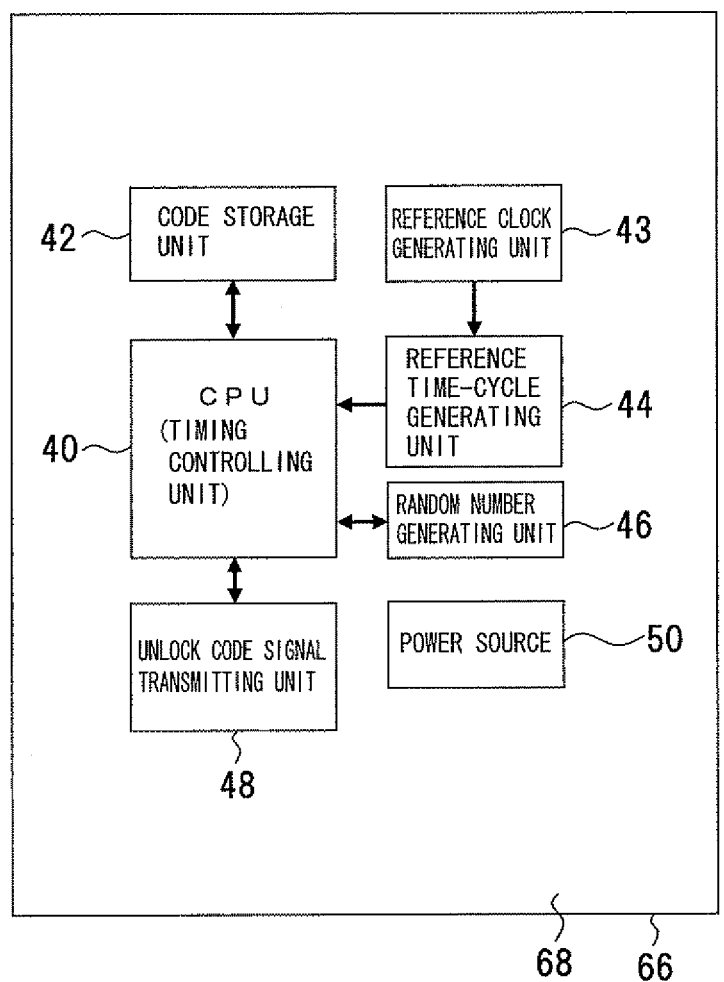
FIG. 11 is a view of a circuit device according to a fifth embodiment.

A fifth embodiment of the present invention will be described referring to FIG. 11. FIG. 11 is a view of a circuit device that is applied to an unlock device.

As shown in FIG. 11, a circuit device 66 is a circuit board 68 with an installment of a function unit that is applied to the unlock device 6 (FIG. 4). In FIG. 11, the same parts in FIG. 4 are identified by the same reference numerals, and will not be described.

By using the circuit board 68, the unlock device 6 that unlocks the cellular phone 4 and various apparatuses that include lock functions can easily be realized.

Sixth Embodiment

Figure 12:
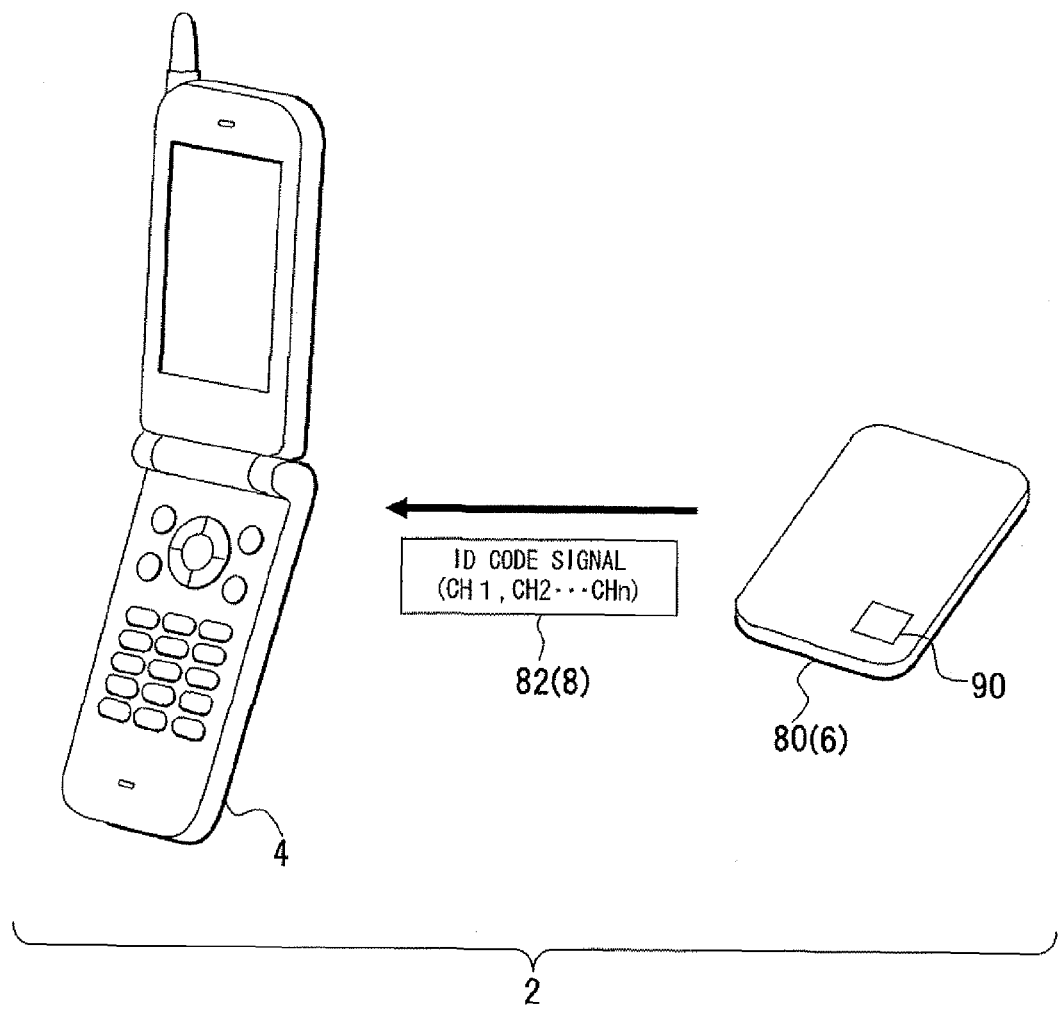
FIG. 12 is a view of a lock system of a cellular phone according to a sixth embodiment.
Figure 13:
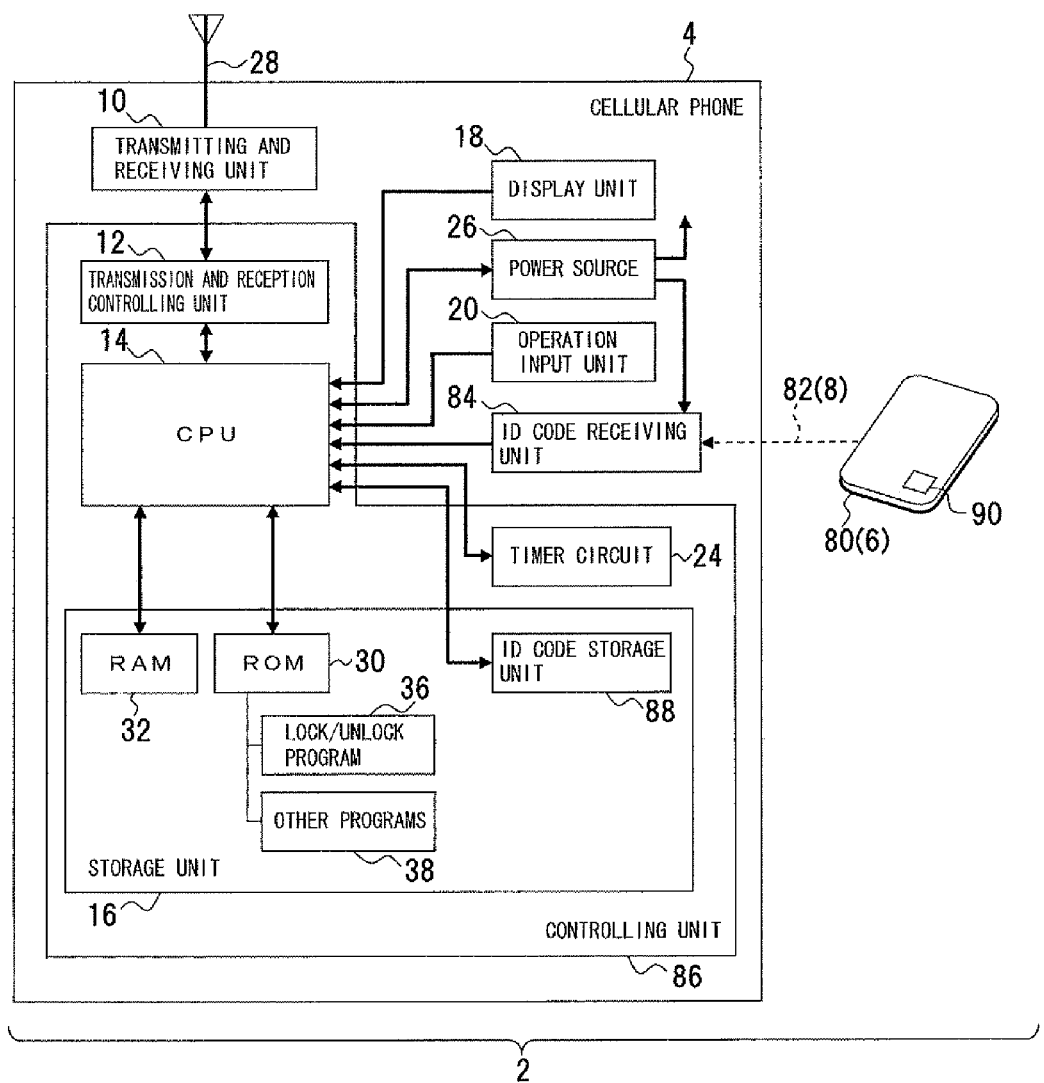
FIG. 13 is a view of an example of a configuration of a cellular phone.
Figure 14:
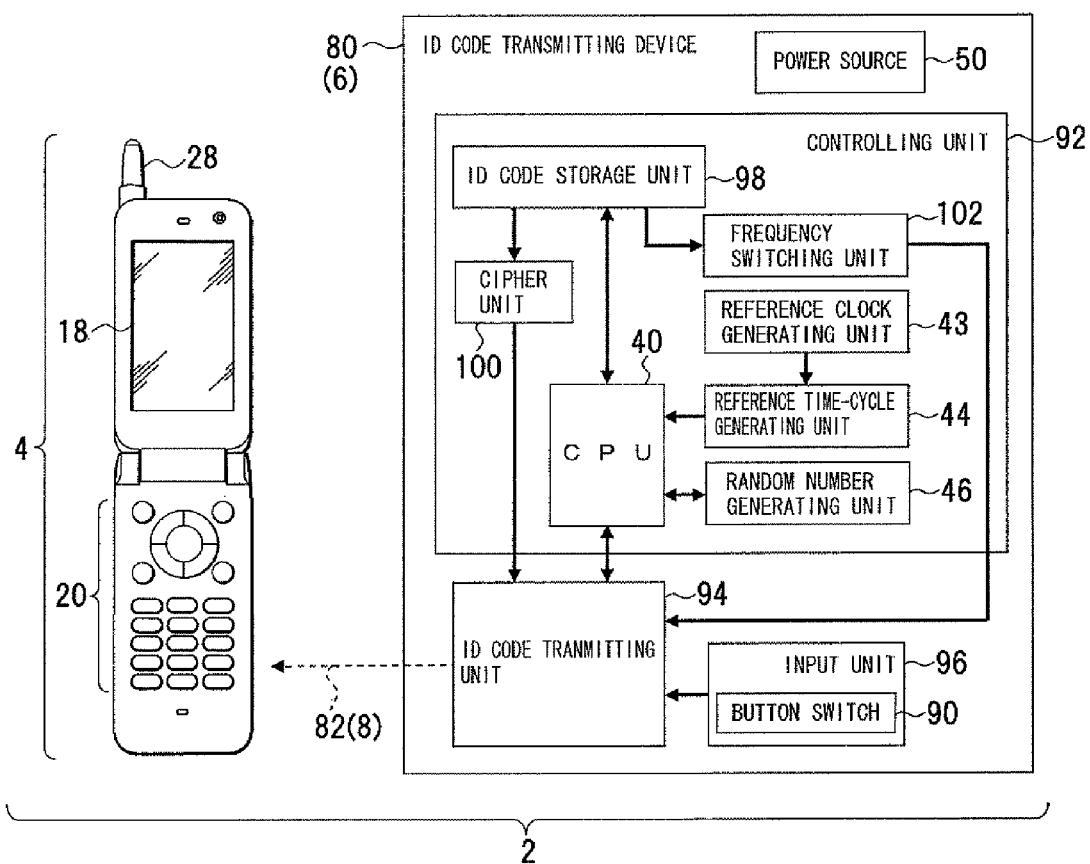
FIG. 14 is a view of an example of a configuration of an ID code transmitting device.

A sixth embodiment of the present invention will be described referring to FIGS. 12 to 14. FIG. 12 is a view of a lock system of a cellular phone according to the sixth embodiment. FIG. 13 is a view of an example of a configuration of the cellular phone. FIG. 14 is a view of a configuration example of an ID code transmitting device. In FIGS. 12 to 14, the same parts in FIGS. 1, 3 and 4 are identified by the same reference numerals.

In the lock system 2 according to the sixth embodiment, an ID code transmitting device 80 as an example of the unlock device 6 sends (communicates) an ID code signal 82 intermittently to the cellular phone 4 as an example of an apparatus allowing only specific users to use and operate. The ID code signal 82 is an example of the unlock code signal 8, and provides a wireless signal such as an electric wave with an ID code. When the cellular phone 4 includes a function receiving the ID code signal 82 from the ID code transmitting device 80, a dial lock, etc. of the cellular phone 4 can be unlocked if the cellular phone 4 receives the ID code signal 82.

In the lock system 2, the ID code signal 82 may be transmitted with signal intensity that makes the ID code signal 82 reach to a constant distance (for example, a few meters), and may be sent intermittently with switching a frequency (channel CH1) In the embodiment, the ID code transmitting device 80 includes a button switch 90, that is operable by a user, and an unlocked function (a manual unlocked function). An operation of the button switch 90 is a moment to make the ID code transmitting device 80 sent the ID code signal 82 irregularly, and the unlocked function is by the ID code signal 82 based on the switch operation.

Aspects of the lock system 2 in the embodiment are as follows.

a. As a frequency of each ID code signal 82 is switched, leaking unlock information by electric wave disturbance and electric wave interception in case that an electric wave is used as a wireless signal of the ID code signal 82 can be avoided (an electric interception block) to improve security. If transmission data such as an ID code is encrypted, the cellular phone 4 may process decrypting the encrypted data to improve security, as well.

b. As well as the first and second embodiment, corresponding to a communication interval of intermittent communication of the ID code signal 82, the reference time-cycle, for example m seconds, is added (+/−n) seconds (n=0, 1, 2 . . . ) to generate a fluctuation of (m+/−n) seconds. If the ID code signal 82 is sent while its transmission timing having irregularity, the lock system 2 can avoid increasing probability of radio wave interference of the ID code signal 82. The battery life can be prolonged (lowing power consumption) in intermittent communication.

c. Switching operation can transmit the ID code signal 82 instantly (irregularly). This results in a faster unlock process than the regular transmission timing. Thus, more speedy unlock is achieved. In this case, continuous transmission of the ID code signal 82 corresponding to pushing down the button switch 90 makes receiving accuracy of the ID code signal 82 in the cellular phone 4 to contribute more speedy unlock high. And in this case, transmission time of the ID code signal 82 may be long corresponding to pushing down the button switch 90 and the time may be set properly the longest to bring the cellular phone 4 high receiving accuracy.

The lock system 2, as shown in FIG. 13, includes the cellular phone 4 as an apparatus unlocked by the received ID code signal 82, and the ID code transmitting device 80 as a example of the unlock device 6. In the lock system 2, the ID code signal 82 sent from the ID code transmitting device 80 is received by the cellular phone 4, and lock operations such as an unlock of the cellular phone 4 and a lock setting for the cellular phone 4 is executed. The ID code signal 82 applies to the unlock code signal 8 in the first embodiment.

The cellular phone 4 in the embodiment includes the transmitting and receiving unit 10, the display unit 18, the operation input unit 20, the power source 26, an ID code receiving unit 84 and a controlling unit 86, etc. The cellular phone 4 is configured with computers as well as the second embodiment. The ID code receiving unit 84 receives the ID code signal 82 sent from the ID code transmitting device 80 and picks out an ID code from the ID code signal 82 based on control of the controlling unit 86.

The controlling unit 86 includes the transmission and reception controlling unit 12, the CPU 14, the storage unit 16 and the timer circuit 24. The storage unit 16 is configured with the ROM 30, the RAM 32 and the ID code storage unit 88. And the lock/unlock program 36 and other programs 38 are stored in the ROM 30 in the controlling unit 86. The ID code is stored in the ID code storage unit 88. The ID code is an example of the unlock code, described above.

The ID code transmitting device 80 in the embodiment is provided with the button switch 90 as an input unit for use in an input operation for transmitting the ID code signal 82 instantly. In addition to the ID code signal 82 sent regularly, upon operating the button switch 90, the operation is a moment to transmit the ID code signal 82 instantly. Corresponding to pushing down the button switch 90, the ID code signal 82 is transmitted continuously.

The ID code transmitting device 80, as shown in FIG. 14, includes the power source 50, a controlling unit 92, an ID code transmitting unit 94, an input unit 96, etc. The controlling unit 92 includes the CPU 40, the reference clock generating unit 43, the reference time-cycle generating unit 44, the random number generating unit 46, an ID code storage unit 98, a cipher unit 100, and a frequency switching unit 102. The input unit 96 includes the button switch 90 as described above.

A reference time-cycle from the reference time-cycle generating unit 44 and random numbers from the random number generating unit 46 are inputted to the CPU 40. The reference time-cycle of the reference time-cycle generating unit 44 is generated from a reference clock signal emitted in the reference clock generating unit 43. The CPU 40 is a timing controlling unit controlling a generating timing of the ID code, that is an example of the unlock code. The CPU 40 inputs the generated timing signal to the ID code storage unit 98 and the ID code transmitting unit 94.

The ID code stored in the ID code storage unit 98 is read out depending on the generating timing from the CPU 40 and inputted to the cipher unit 100. The cipher unit 100 encrypts the ID coder and the encrypted ID code is inputted to the ID code transmitting unit 94. The ID code read from the ID code storage unit 98 is inputted to the frequency switching unit 102 to be used for frequency switching.

Figure 15A:
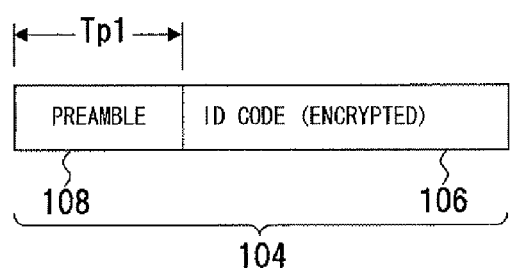
FIG. 15 is a view of a transmission data of an ID code transmitting unit.
Figure 15B:
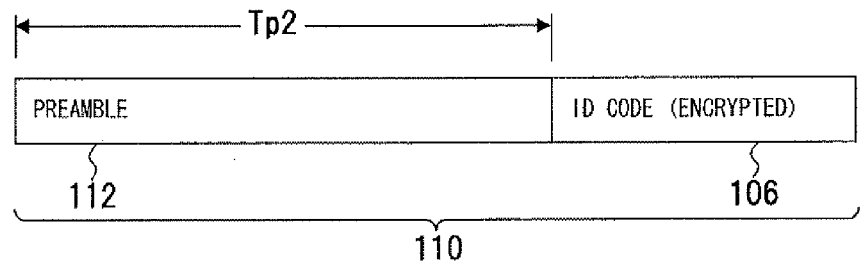

Transmission data of the ID code will be explained referring to FIGS. 15A and 15B. FIGS. 15A and 15B are views of the transmission data in an ID code transmitting unit. FIG. 15A is a view of the transmission data in regular communication, and FIG. 15B is a view of the transmission data in instant communication.

Each transmission data is generated by the ID code transmitting unit 94. A regular transmission code 104 is, as shown in FIG. 15A, an ID code encrypted in the cipher unit 100, i.e., an encrypted ID code 106, that is added a preamble 108 for regular transmission. A length of the preamble 108, Tp1 is a time length corresponding to frequency synchronization of the ID code receiving unit 84. The regular transmission code 104 is sent from the ID code transmitting device 80 to the cellular phone 4 regularly by a trigger of the CPU 40.

An instant transmission code 110 is, as shown in FIG. 15B, an ID code encrypted in the cipher unit 100, i.e., the encrypted ID code 106, that is added a preamble 112 for instant transmission. A length of the preamble 112, Tp2 is a time length over a sensing time-cycle of the ID code receiving unit 84. The instant transmission code 110 is sent from the ID code transmitting device 80 to the cellular phone 4 based on a trigger of the button switch 90. The instant transmission code 110 is sent asynchronously, so in order to have the instant transmission code 110 received surely by the receiving device, the length of the preamble 112, Tp2 is set long.

Operations of the ID code transmitting device 80 and the cellular phone 4 will be explained referring to FIGS. 16A to 19B. FIGS. 16A to 19B are timing charts of operation timings.

A transmission timing of an ID code signal as an unlock code signal will also be allowed to have irregularity to give a communication interval of intermittent communication a fluctuation in the embodiment as well as the second embodiment.

A. In regular communication (no switch operation) transmitting an ID code signal regularly (FIGS. 16A to 17F).

To form the communication interval of intermittent communication, as shown in FIG. 16A, a reference clock signal is obtained from the reference clock generating unit 43. The reference clock signal is added to the reference time-cycle generating unit 44. The reference time-cycle generating unit 44 generates, as shown in FIG. 16B, a reference time-cycle signal that rises in synchronization with a rise of the reference clock signal. The reference time-cycle signal and random number values from the random number generating unit 46 are inputted to the CPU 40. Thus, the ID code signal 82 as the unlock code signal can be obtained. C0, C1, C2, C3 . . . represent the ID code signal 82 being transmitted in FIG. 16C. The starting point of the ID code signal 82 is at the rise of the reference time-cycle signal, and the transmission timing Tu that is provided with the random time deviation of the above written equation (1) is generated. In this case, if the reference time-cycle is 5 seconds and the random number deviation is +/−1 second, a transmission timing Tu1 of an ID code signal C1 is 4 (=5−1) seconds, a transmission timing Tu2 of an ID code signal C2 is 6 (=5+1) seconds, a transmission timing Tu3 of an ID code signal C3 is 4.5 (=5−0.5) seconds.

The fluctuation is added to a communication interval of a plurality of ID code signals C1, C2, C3 . . . . The ID code signals are provided with the transmission timing Tu1, Tu2, Tu3 (Tu1≠Tu2≠Tu3≠ . . . ) that have such irregularity as mentioned above. Trans-mission time Td is set to each ID code signal C1, C2, C3 . . . .

The ID code is added to each ID code signal C0, C1, C2, C3 . . . that is sent respectively with switching different frequency channel CH1, CH2, CH3, CH4 . . . CHn (CH1≠CH2≠CH3≠CH4 . . . ). Each ID code signal C0, C1, C2, C3 . . . is sent by a weak wireless signal (electric wave).

A receiving window and a reception timing are set at the ID code receiving unit 84 of the cellular phone 4 for receiving the ID code signal C1, C2, C3 . . . . FIG. 16D is a view of a reception ID code signal of the ID code receiving unit 84 of the cellular phone 4. In FIG. 16D, D1 represents a reception timing signal, and D20, D21, D22, D23 . . . represents the reception ID code signal corresponding to the ID code signal C0, C1, C2, C3 . . . , respectively. A sensing time-cycle Tw is set in the reception timing signal D1 for sensing the ID code signal C0, C1, C2, C3 . . . . Two means sensing time.

If the ID code detected from the ID code signal D20, D21, D22, D23 . . . received at the ID code receiving unit 84 corresponds to the ID code stored in the ID code storage unit 88, the cellular phone 4 is unlocked. As shown in FIG. 16E, the cellular phone 4 is in an unlocked (OFF) state, and can be used normally. FIG. 16F is a reference time scale of the reference time.

In case that the distance between the cellular phone 4 and the ID code transmitting device 80 becomes larger over the range capable of receiving the ID code signal 82 that is a wireless signal, the cellular phone 4 becomes incapable of receiving the ID code signal 82.

Figure 16:
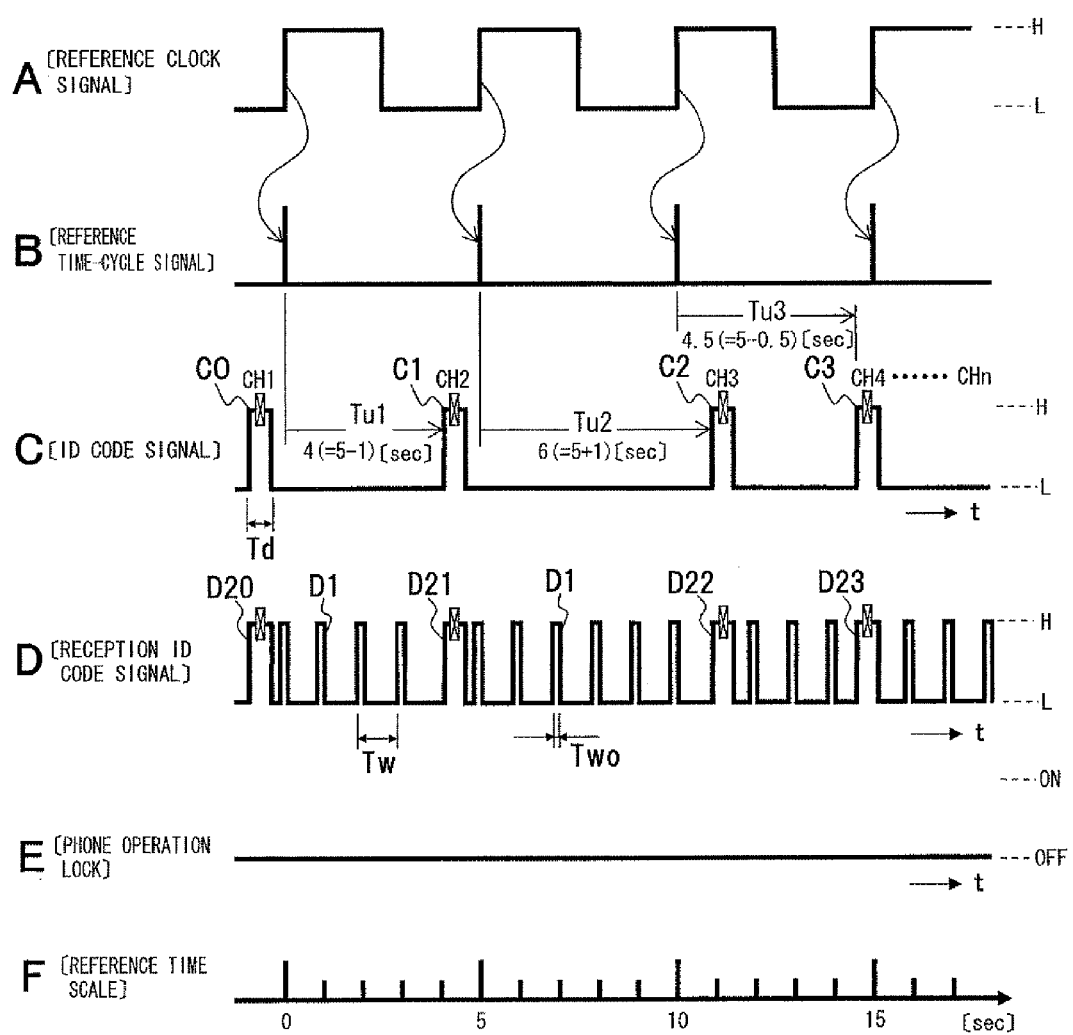
FIG. 16 is a timing chart of operation timing.
Figure 17:
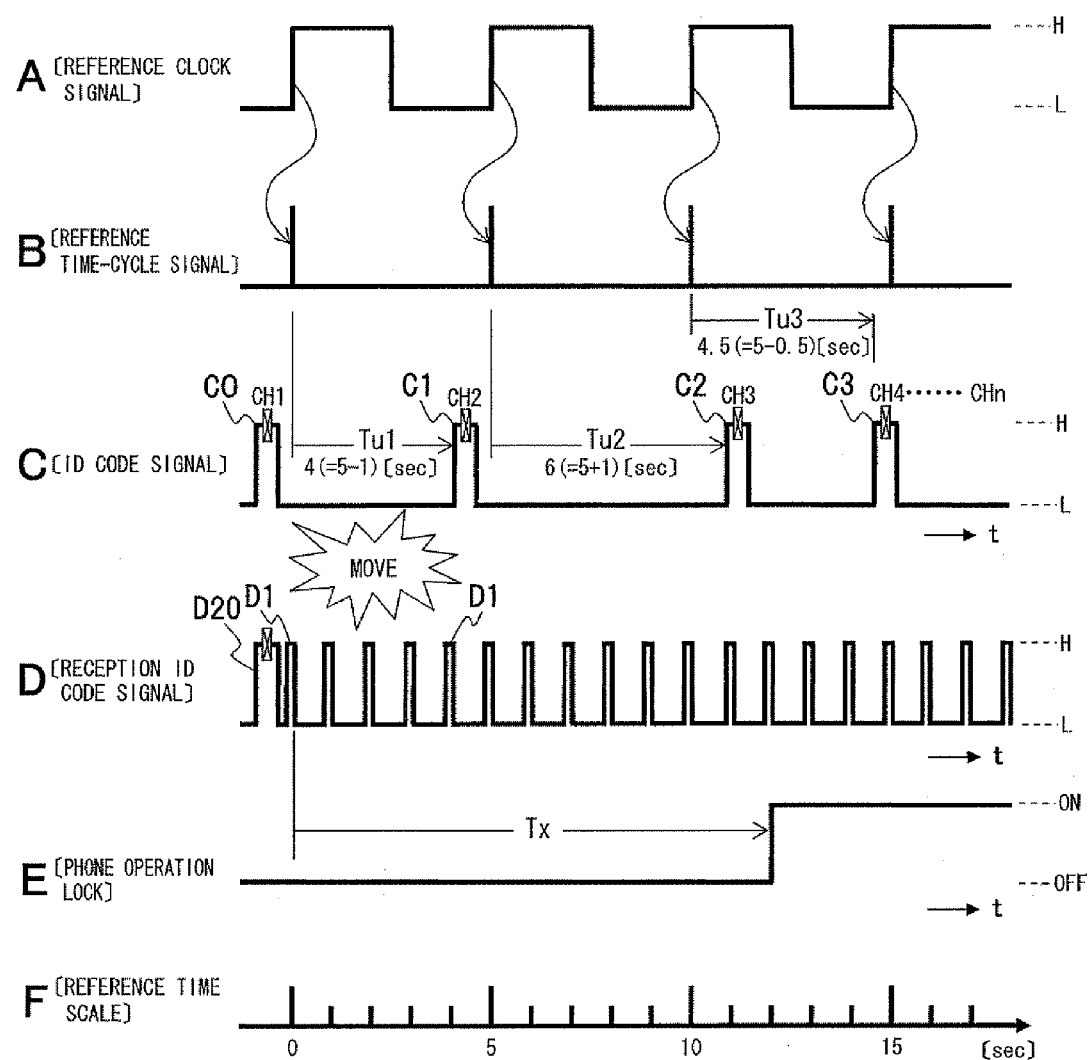
FIG. 17 is a timing chart of operation timing.

FIG. 17 corresponds to FIG. 16. FIG. 17A is a reference clock signal, FIG. 17B is a reference time-cycle signal and FIG. 17C is an ID code signal.

For example, if the reference time-cycle is 5 seconds, the random number deviation is +/−1 second and a lock timing is 12 seconds, after the reception of the ID code signal C0, monitoring of elapsed time starts from a falling edge of the reception timing signal D1. If the cellular phone 4 cannot receive the ID code signal by a constant time period Tx, for example Tx=12 seconds, from the edge, as shown in FIG. 17E, the cellular phone 4 switches to the locked (ON) state and a locked telephone operation function, such as a dial-locked state. FIG. 17F is a reference time scale of the reference time.

If the cellular phone 4 switches to such a locked state, the cellular phone 4 side can receive the ID code signal 82. If the distance between the cellular phone 4 and the ID code transmitting device 80 becomes within predetermined distance, the locked state is unlocked. Even if the cellular phone 4 is in the locked state, the user's inputting an ID code such as a password unlocks the locked state as well so that the user can use the cellular phone 4.

B. In the case to which irregular communication sending the ID code signal irregularly by operating the button switch 90 is added (FIGS. 18A to 18B).

Figure 18:
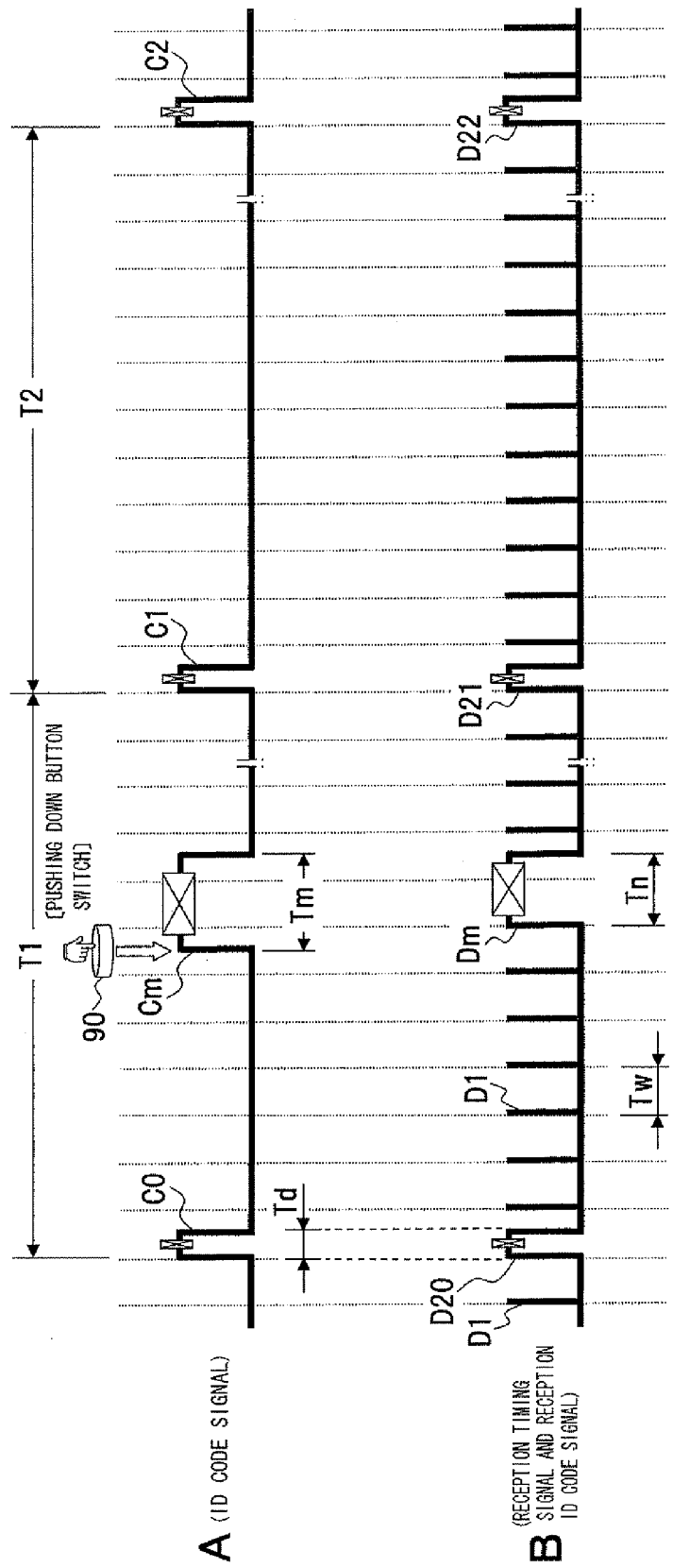
FIG. 18 is a timing chart of operation timing.
Figure 19:
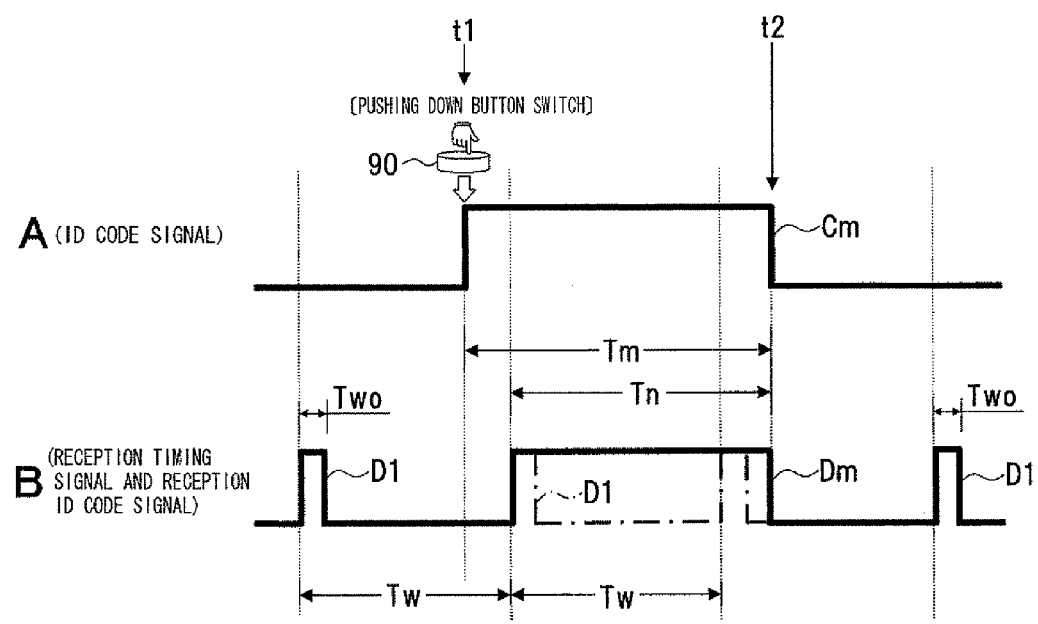
FIG. 19 is a timing chart of operation timing.

FIG. 18 shows transmitting and receiving operations of the ID code signal 82. FIG. 18A shows the ID code signal sent from the ID code transmitting device 80, and FIG. 18B shows the reception timing signal and the reception ID code signal.

In FIG. 18A, C0, C1, C2 . . . are the ID code signal 82 by regular communication, and Cm is the ID code signal 82 sent by the operation of the button switch 90. In this case, T1, T2 are a communication time-cycle, T1=T2=5 seconds. Tm is a transmission time period corresponding to the time of pushing down of the button switch 90.

In case that the button switch 90 is not pushed down, as shown as C0, C1, C2 . . . in FIG. 18A, the communication by the ID code signal 82 of the regular communication is executed. In case that the button switch 90 is pushed down, the ID code signal Cm based on pushing down is sent. The ID code signal Cm is generated with a moment of pushing down the button switch 90 to be sent. The transmission time period Tm becomes a length corresponding to the time of pushing down the button switch 90. That is, the ID code signal Cm is sent more instantly compared with the ID code signal of the regular communication, C0, C1, C2 . . . because the ID code signal Cm is based on pushing down the button switch 90. And the transmission time period Tm becomes long corresponding to the time of pushing down the button switch 90, not the constant transmission time period like the ID code signal C0, C1, C2 . . . .

In FIG. 18B, D1 is a reception timing signal, D20, D21, D22 . . . is a reception ID code signal corresponding to the ID code signal C0, C1, C2 . . . , respectively, Dm is a reception ID code signal corresponding to the ID code signal Cm being sent by the operation of the button switch 90, and Tn is a reception time period. In this case, Tn<Tm. It is caused by a reception timing to shorten the reception time period less than the transmission time period.

In this way, when the ID code signal 82 by the button switch 90 is received, the cellular phone 4 obtains, as shown in FIG. 19B, the reception ID code signal Dm corresponding to the ID code signal Cm, as shown in FIG. 19A.

FIGS. 19A and 19B are expanding views of the transmission and reception timing of the ID code signal 82 by the button switch 90. The button switch 90 is pushed down at a time point t1 to generate the ID code signal Cm of the transmission time period Tm, corresponding to the pushing down. The ID code signal Cm is cancelled at time point t2. The ID code signal Cm can be transmitted instantly based on pushing down the button switch 90. The transmission time period Tm is, for example, 322 milliseconds.

In contrast, the cellular phone 4 obtains the reception ID code signal Dm, as shown in FIG. 19B. The reception ID code signal Dm rises in synchronization with a first reception timing signal D1 from a time point t1 of a rise of the transmission ID code signal Cm. The reception ID code signal Dm falls at a time point t2. For this, the reception time period Tn is shortened less than the transmission time period Tm. In FIG. 19B, Two is a sensing time, for example 4 milliseconds, and Tw is a sensing time-cycle, for example 250 milliseconds.

Figure 20:
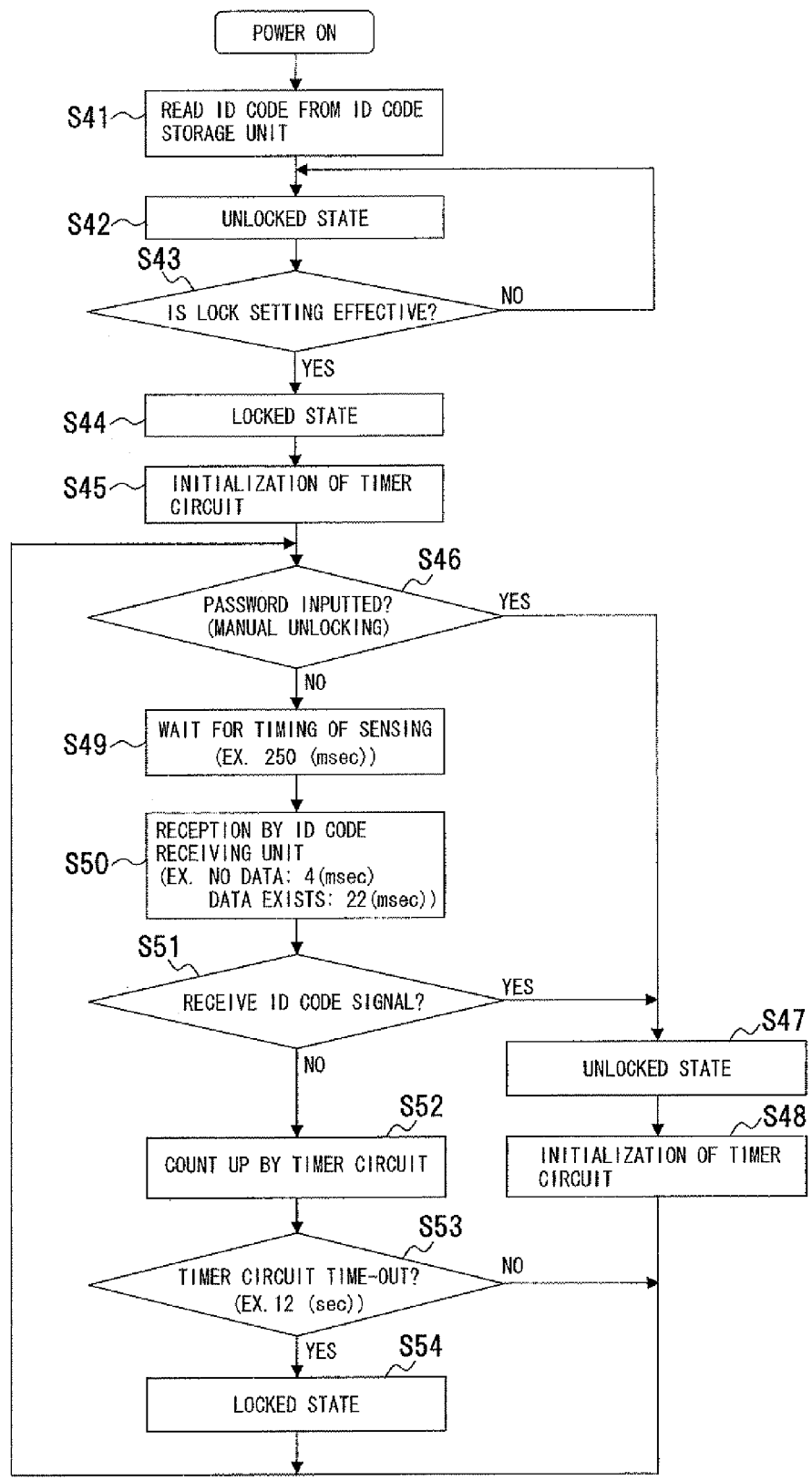
FIG. 20 is a flow chart of process procedures of a cellular phone.
Figure 21:
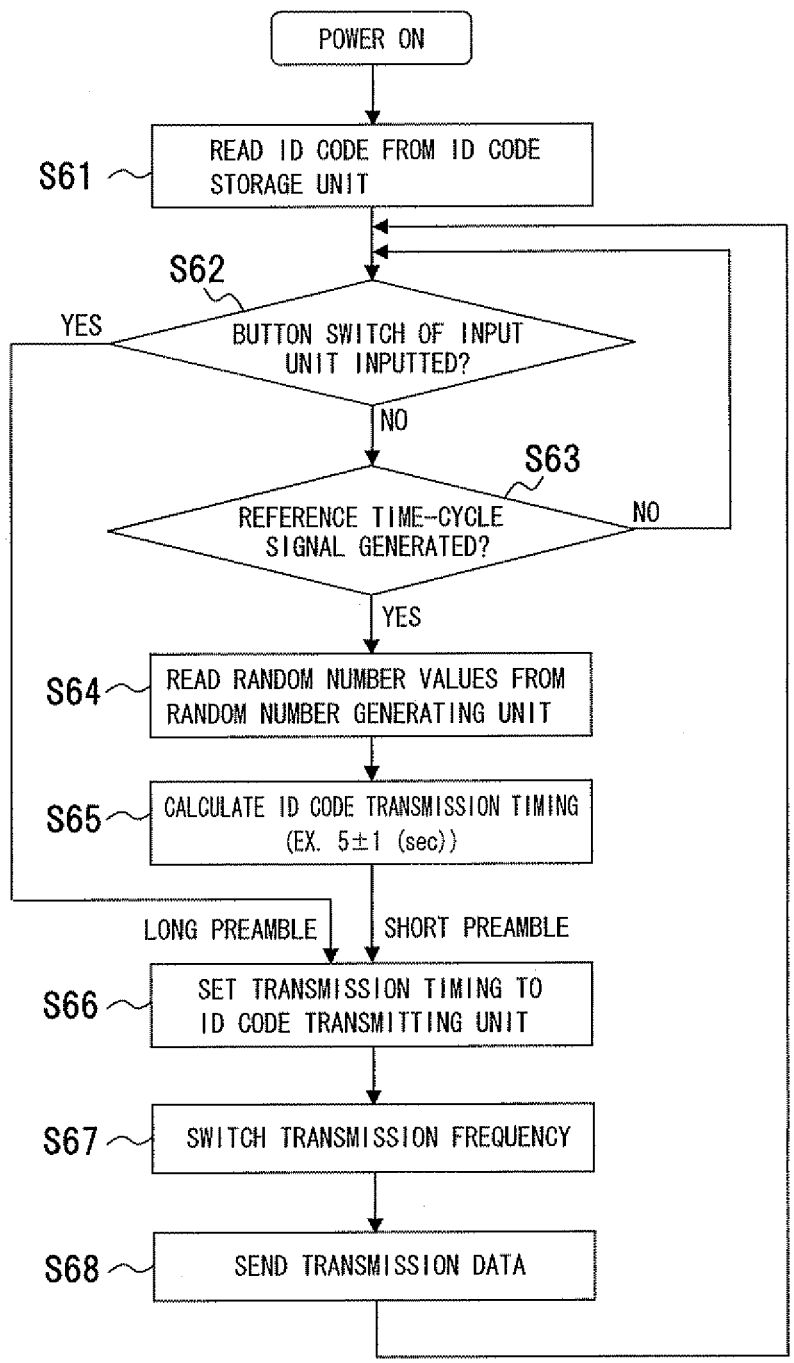
FIG. 21 is a flow chart of process procedures of an ID code transmitting device.

An operation of the cellular phone 4 and the ID Code transmitting device 80 in this case will be explained referring to FIGS. 20 and 21. FIG. 20 is a flow chart of process procedures for process methods and operation programs of the cellular phone 4. FIG. 21 is a flow chart of process procedures for process methods and operation programs of the ID code transmitting device As shown in FIG. 20, when a power source is applied, an ID code is read from the ID code storage unit 88 (step S41), and becomes an unlocked state (step S42). Whether a lock setting is effective is determined (step 343). When the lock setting is ineffective (step S43 NO) the unlocked state is maintained, and when the lock setting is effective (step S43 YES), the procedure shifts to a locked state (step S44). The timer circuit 24 is initialized (step 345), and whether a manually unlocked operation, for example, the password input is executed is determined (step S46) When the password is inputted (step S46 YES), the cellular phone 4 is manually unlocked to be an unlocked state (step 347). The timer circuit 24 is initialized in synchronization with the shift to the unlock state (step S48).

In step S46, when the password is not inputted (step S46 NO), the procedure waits, for example only for 250 milliseconds, as a sensing timing of a constant time period (step S49), and the ID code receiving unit 84 receives the ID code signal 82 (step S50). If data from the ID code signal 82 doesn't exist, the procedure waits, for example for 4 milliseconds, as a constant time interval, and if the data from ID code signal 82 exists, the procedure waits, for example for 22 milliseconds, as the constant time interval. Whether the ID code signal can be received is determined (step S51), and if the ID code signal can be received (step S51 YES), the cellular phone 4 shifts to the unlocked state (step 347). If the ID code signal cannot be received (step S51 NO) the timer circuit 24 starts a count-up (step S52). Whether the timer circuit 24 counts that a constant time, for example 12 seconds, as a time-out has elapsed is determined (step S53), and when the constant time has not elapsed (step S53 NO), the procedure returns to step S46, and processes of steps S46 to S53 are executed. When the constant time has elapsed (step S53 YES), the procedure shifts to the locked state (step 354) and returns to step S46 since the ID code signal is not received.

Processes of operation programs of the ID code transmitting device 80 as an unlock device unlocking such a cellular phone 4 include a process corresponding to whether an input from the button switch 90 of the input unit 96 exists, and a process of switching a transmission frequency, etc.

As shown in FIG. 21, when a power source is applied, the ID code transmitting device 80 reads an ID code from the ID code storage unit 98 (step S61), whether an input from the button switch 90 of the input unit 96 exists is determined (step S62). If the input of the button switch 90 doesn't exist (step S62 NO), whether the reference time-cycle signal is generated is determined (step S63), and if the reference time-cycle signal is not generated (step S63 NO), processes of step S62 and S63 are tried again. If the reference time-cycle signal is generated (step S63 YES), the random number values are read from the random number generating unit 46 (step S64), an ID code transmission timing is calculated from the random number values and the reference time-cycle signal (step S65). It is calculated that the transmission timing is (5+/−1) seconds by adding a value +/−1 depending on the random number value, if the reference time-cycle is 5 seconds. In this case, if the input of the button switch 90 doesn't exist, a short preamble (the preamble 108 in FIG. 15A) is set. A transmission timing calculated by CPU 40 is set in the ID code transmitting unit 94 (step S66), a transmission frequency is switched (step S67), transmission data including the ID code is sent (step S68), the procedure returns to step S62.

If the input is provided by the operation of the button switch 90 (step S62 YES), the transmission timing at step S66 is set with jumping the processes of step S63 to S65 (step S66). In this case, a long preamble (the preamble 112 in FIG. 15B) is set based on the input of the button switch 90. That is, a continuous input of the button switch 90 allows the same transmission data to be sent continuously.

In the embodiment, failures of the radio wave disturbance in case of using a wireless communication are reduced, radio interception is prevented, and a cellular phone can be locked and/or unlocked. Intermittent transmission and reception can prolong the battery life.

Figure 22:
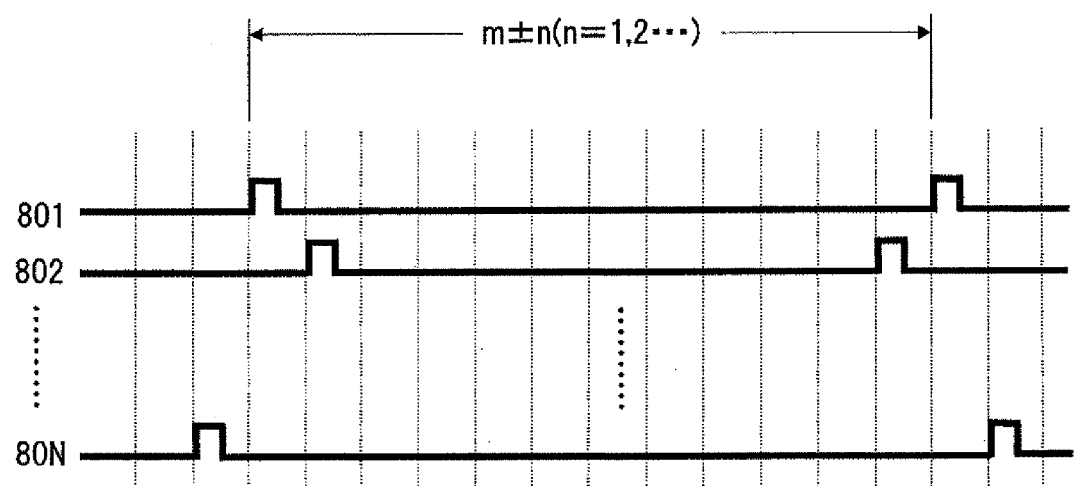
FIG. 22 is a view of irregularity of each ID code signal of a plurality of ID code transmitting devices.

A relationship of ID code signals of a plurality of ID code transmitting devices will be explained referring to FIG. 22. FIG. 22 is a view of irregularity of each ID code signal of a plurality of ID code transmitting devices 801, 802 . . . 80N.

Each ID code signal of a plurality of ID code transmitting devices 801, 802 . . . 80N is set a transmission time cycle (m+/−n) (n−1, 2 . . . ) as a transmission timing to generate a fluctuation, thus radio wave interference of each ID code signal of each ID code transmitting device 801, 802 . . . 80N is avoided. As a result, reliability of an unlock process is improved.

Seventh Embodiment

A seventh embodiment of the present invention will be described referring to FIGS. 23A to 23D. FIGS. 23A to 23D are views of frequency switching of an ID code signal according to the seventh embodiment. In FIGS. 23A to 23D, the same parts in FIGS. 16A to 17F are identified by the same reference numerals.

The above described lock system 2 (FIGS. 12 to 14), the regular transmission code (FIG. 15A), the instant transmission code (FIG. 15B), the operation program (FIGS. 20 and 21), etc. will also be used in the embodiment.

In the sixth embodiment, a frequency channel is switched in order of CH1, CH2, CH3, CHn, as shown in FIGS. 16 and 17. In the embodiment, combination of a frequency channel may be calculated on a basis of the ID code stored in the ID code storage unit 98, and a different frequency may be set by each ID code signal on a basis of the combination.

Figure 23:
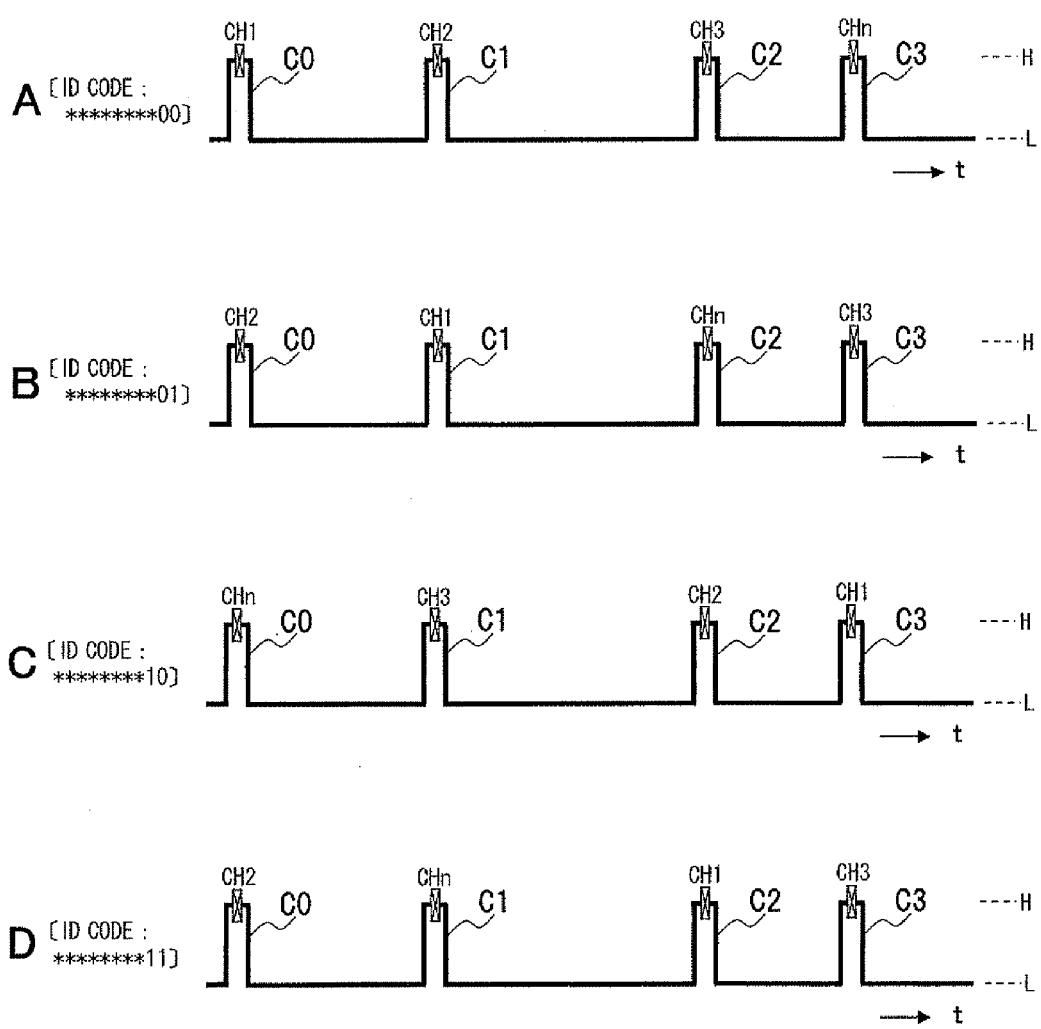
FIG. 23 is a view of frequency switching of an ID code signal according to the seventh embodiment.

FIGS. 23A to 23D show examples of the settings. FIG. 23A is a case of an ID code "******00". A frequency channel is CH1, CH2, CH3, CHn (→CH1 . . . ), FIG. 23B is a case of an ID code "****01". A frequency channel is CH2, CH1, CHn, CH3 (→CH2 . . . ), FIG. 23C is a case of an ID code "****10". A frequency channel is CHn, CH3, CH2, CH1 (→CHn . . . ), FIG. 23D is a case of an ID code "****11". A frequency channel is CH2, CHn, CH1, CH3 (→CH2** . . .).

The combination of such a frequency channel allows avoiding inconvenience from interference of the ID code signal.

Eighth Embodiment

Figure 24:
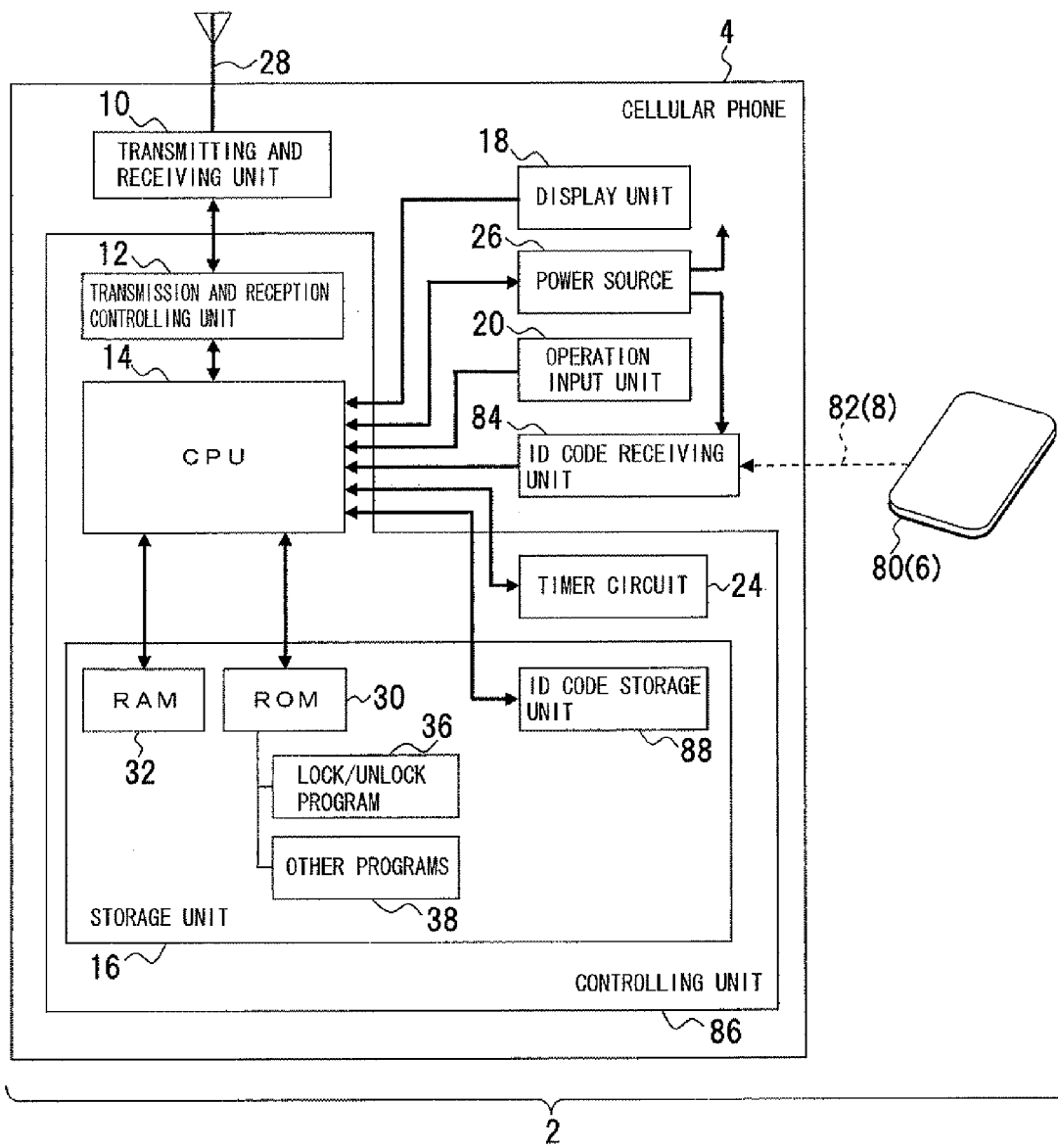
FIG. 24 is a view of an example of a configuration of a lock system and a cellular phone according to an eighth embodiment.
Figure 25:
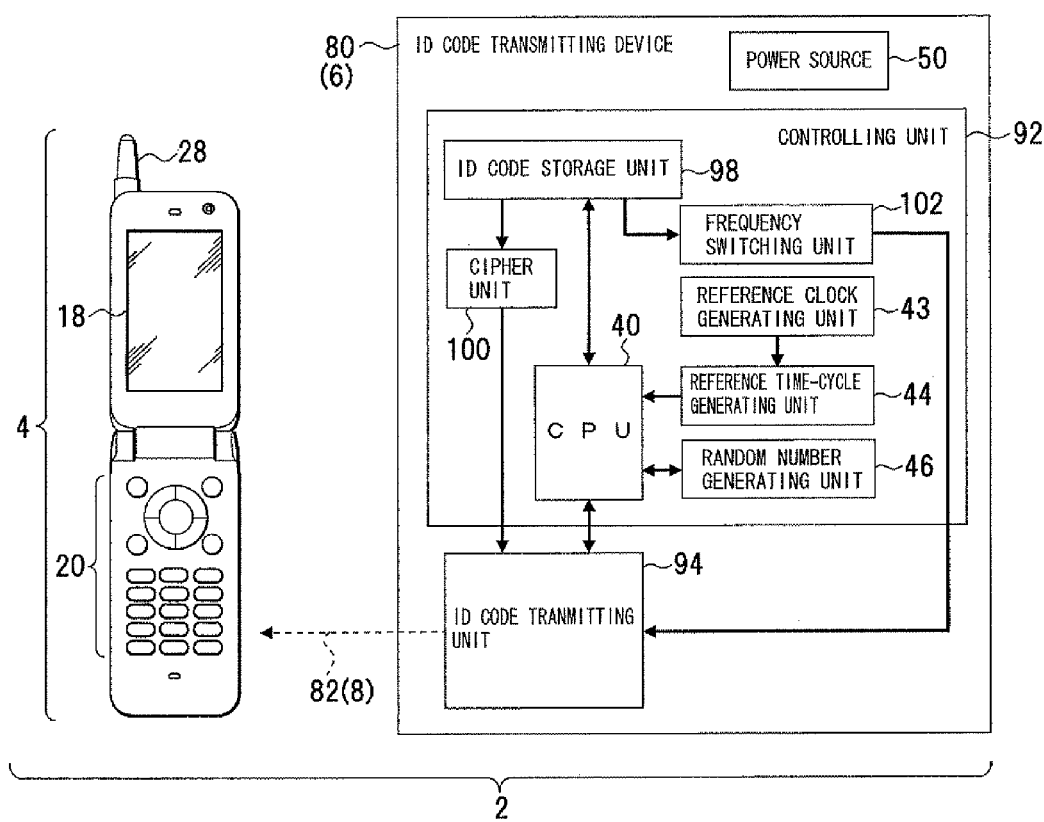
FIG. 25 is a view of an example of a configuration of a lock system and an ID code transmitting device.

An eighth embodiment of the present invention will be described referring to FIGS. 24 and 25. FIG. 24 is a view of an example of a configuration of a lock system and a cellular phone according to the eighth embodiment. FIG. 25 is a view of an example of a configuration of a lock system and an ID code transmitting device. In FIGS. 24 and 25, the same parts in FIGS. 13 and 14 are identified by the same reference numerals.

In the sixth embodiment, the ID code transmitting device 80 includes the button switch 90, and sends the ID code signal 82 according to pushing down the button switch 90. The ID code signal 82 is received by the cellular phone 4 to be unlocked. Like the present embodiment (FIGS. 24 and 25), the ID code transmitting device may not include the button switch 90 to unlock only by the regular communication. Other configurations are the same as the sixth embodiment and are not described.

Ninth Embodiment

Figure 26:
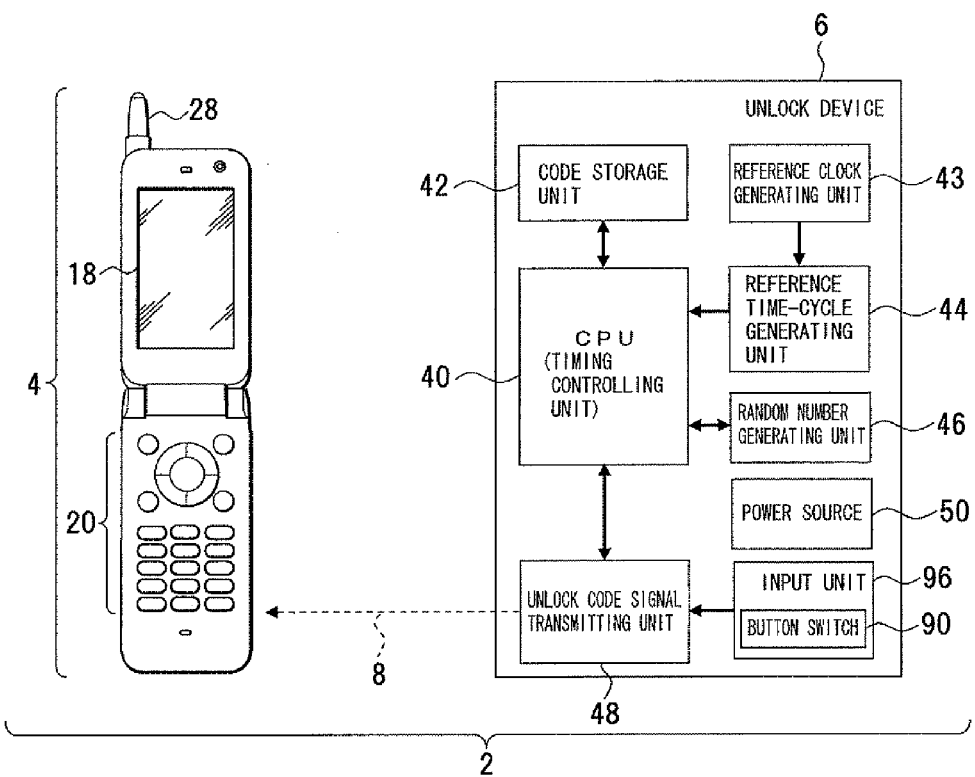
FIG. 26 is a view of an example of a configuration of a lock system and an unlock device according to a ninth embodiment.

A ninth embodiment of the present invention will be described referring to FIG. 26. FIG. 26 is a view of an example of a configuration of a lock system and an unlock device according to the ninth embodiment. In FIG. 26, the same parts in FIG. 4 are identified by the same reference numerals.

In the first to fifth embodiments (FIG. 1 to FIG. 11), the unlocking by the regular communication of the unlock code signal 8 is described. In the embodiment, as shown in FIG. 26, the input unit 96 including the button switch 90 may be disposed in the unlock device 6 (FIG. 4), and the unlock code signal 8 may be sent irregularly according to pushing down the button switch 90, as described in the sixth embodiment.

Other Embodiments (1) In the fourth and fifth embodiments, the circuit device concerning the first to third embodiments is described. The circuit device 60 in the fourth embodiment can be applied to the sixth to eighth embodiments if the unlock code signal receiving unit 22 is shifted to the ID code receiving unit 84 (FIG. 13), and the circuit device 66 in the fifth embodiment can also be applied to the sixth to eighth embodiments if the unlock code signal transmitting unit 48 is shifted to the ID code transmitting unit 94.

Figure 27:
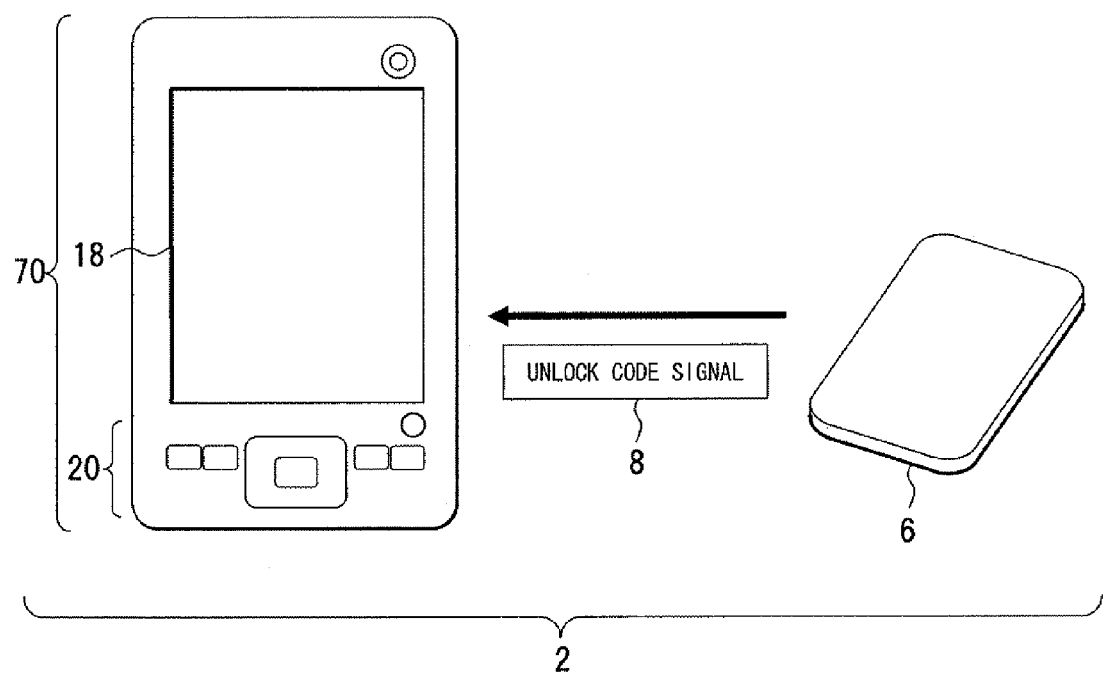
FIG. 27 is a view of a lock system of a PDA according to another embodiment.
Figure 28:
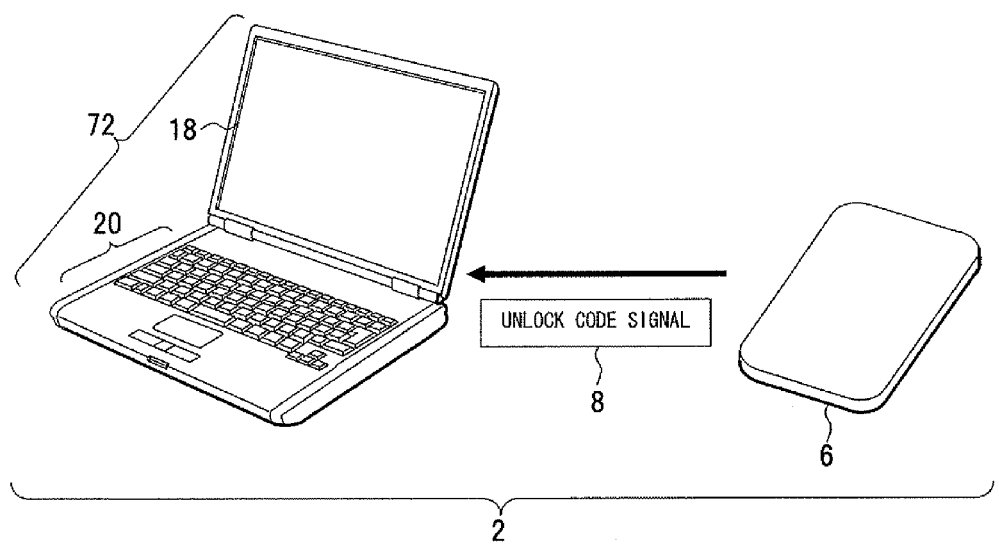
FIG. 28 is a view of a lock system of a personal computer according to another embodiment.
Figure 29:
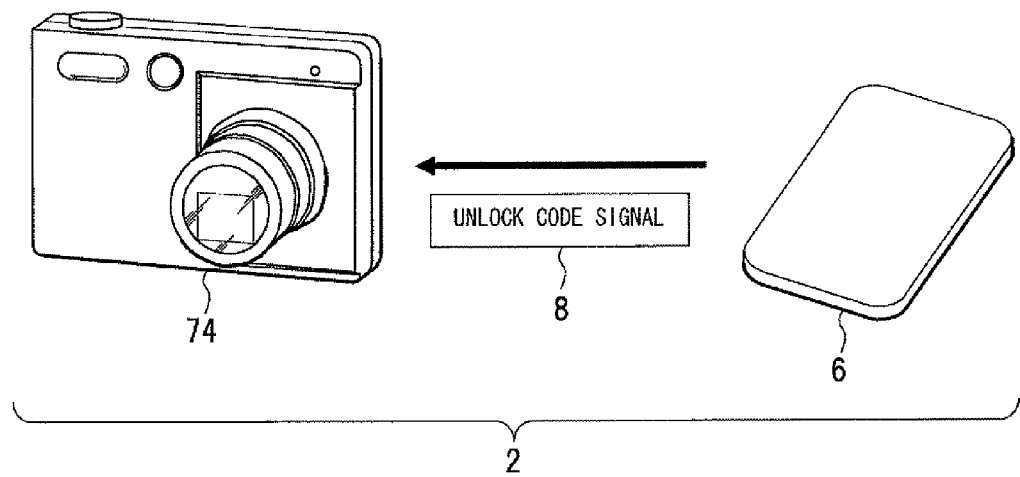
FIG. 29 is a view of a lock system of a digital camera according to another embodiment.
Figure 30:
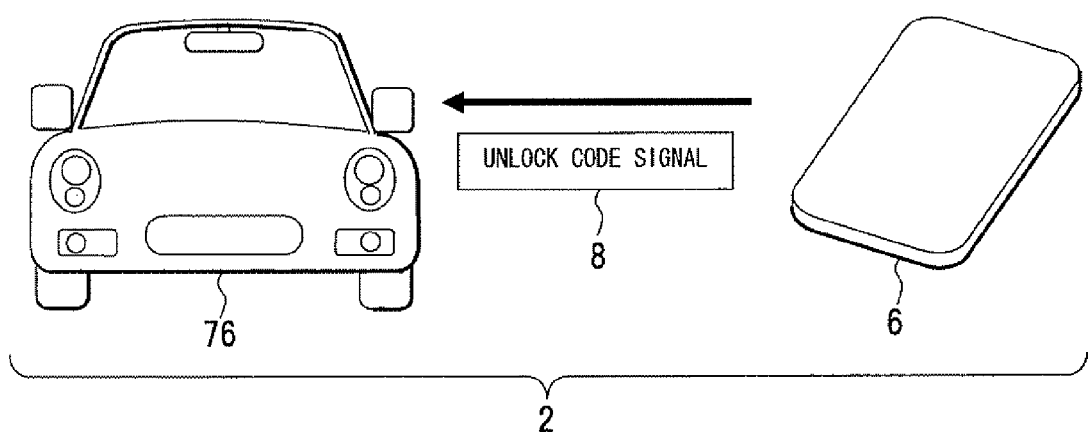
FIG. 30 is a view of an automobile according to another embodiment.

(2) Although, in the embodiments mentioned above, the cellular phone 4 is explained as an example of a apparatus that unlocks a lock with the unlock code signal 8, the present invention is not limited to such a cellular phone, and can be applied to, the lock system 2 of a PDA (Personal Digital Assistant) 70 of FIG. 27, the lock system 2 of a personal computer 72 of FIG. 28, the lock system 2 of a digital camera 74 of FIG. 29, and the lock system 2 of a door lock or an engine lock, etc., of an automobile 76 of FIG. 30, for example. In FIGS. 27 to 30, the same parts in FIG. 1 are identified by the same reference numerals, and will not be described.

(3) Although, in the embodiments mentioned above, for the transmission timing of the unlock code signal 8, the reference time-cycle is 5 [sec], the time deviation (fluctuation) of the random number is +/−1 [sec], and the transmission timing is 5+/−1 [sec], the transmission timing is not limited to these number values. With the setting of the transmission timing, the radio wave interference of the unlock code signal can be avoided even if a plurality of apparatuses that use unlock code signals for unlocking are close to each other, and the reliability of locking and unlocking can be maintained.

(4) Although, in the embodiments mentioned above, the operation of the unlock code signal receiving unit 22 or the power feeding thereof is stopped except during the reception-ON time Ton of the unlock code signal 8, not only those of the unlock code signal receiving unit 22 but also the operations or power feedings of other function units can be stopped, and the low power consumption can be achieved further.

(5) Although, in the embodiments mentioned above, the cellular phone decrypts the cipher of the unlock code data such as the ID code. The decrypting process may be executed by the main CPU of the controlling unit or by another CPU.

Although the preferred embodiments of the present invention are described above, the present invention is not limited to the foregoing descriptions. Persons skilled in the art can obviously make modifications and changes based on the claims or the descriptions that are disclosed in the specification, and the modifications and the changes are definitely within the scope of the present invention.

The present invention relates to the lock system that uses the unlock signal to lock or unlock the functions of various apparatuses such as the cellular phone, and the present invention avoids malfunction caused by receiving failures such as radio wave interference, and reduces power consumption by setting the receiving window to receive the unlock signal, and therefore the lock system is useful.

What is claimed is:

1. A lock system that unlocks a lock with an unlock signal comprising:
   a controlling unit that generates irregular transmission timings corresponding to reference time-cycle signals respectively by adding a random time deviation to each of the reference time-cycle signals, each of the reference time-cycle signals being generated at reference time-cycle intervals;
   a button switch that transmits the unlock signal;
   a transmitting unit that transmits the unlock signal at each of the irregular transmission timings and when the button switch is operated; and
   an unlocking unit that unlocks a lock in a case where the unlocking unit receives the unlock signal transmitted from the transmitting unit within a predetermined time, wherein
   each of the random time deviations added to the reference time-cycle signal is different from each other, each time difference between the reference time-cycle signal and the unlock signal is different from each other, and the unlock signal is transmitted from the transmitting unit at the irregular transmission timings of irregular intervals, and
   a length of a preamble which is added to the unlock signal is different between the unlock signal transmitted at the irregular transmission timings and the unlock signal transmitted when the button switch is operated.

2. The lock system of claim 1, further comprising:
   a receiving unit that receives the unlock signal, wherein
   a reception-ON time and a reception-OFF time of the unlock signal are set at the receiving unit, and wherein
   power feeding to the receiving unit is stopped during the reception-OFF time.

3. The lock system of claim 1, wherein the transmitting unit transmits unlock signals by varying frequencies of the unlock signals to be transmitted.

4. An unlock device that transmits an unlock signal to an apparatus that is in a locked state comprising:
   a controlling unit that generates irregular transmission timings corresponding to reference time-cycle signals respectively by adding a random time deviation to each of the reference time-cycle signals, each of the reference time-cycle signals being generated at reference time-cycle intervals; and
   a button switch that transmits the unlock signal;
   a transmitting unit that transmits the unlock signal at each of the irregular transmission timings and when the button switch is operated, wherein
   each of the random time deviations added to the reference time-cycle signal is different from each other, each time difference between the reference time-cycle signal and the unlock signal is different from each other, and the unlock signal is transmitted from the transmitting unit at the irregular transmission timings of irregular intervals, and
   a length of a preamble which is added to the unlock signal is different between the unlock signal transmitted at the irregular transmission timings and the unlock signal transmitted when the button switch is operated.

5. The unlock device of claim 4, further comprising:
   a storage unit that stores an unlock code;
   a reference time-cycle generating unit that generates the reference time-cycle signal; and
   an irregularity information generating unit that generates irregularity information, wherein
   the controlling unit adds the irregularity information generated from the irregularity information generating unit to the reference time-cycle signal generated from the reference time-cycle generating unit to add the irregularity to the unlock code read from the storage unit, and makes the transmitting unit transmit the unlock signal at the transmission timing with the irregularity.

6. The unlock device of claim 4, wherein
   the irregularity provided with the unlock signal is set by using a random number.

7. The unlock device of claim 4, wherein the transmitting unit transmits unlock signals by varying frequencies of the unlock signals to be transmitted.

8. An unlock method that unlocks a lock of an apparatus that is in a locked state with an unlock signal comprising:
   transmitting the unlock signal at each irregular transmission timing, the irregular transmission timing being generated by adding a random time deviation to each reference time-cycle signal, the irregular transmission timing corresponding to the reference time-cycle signal, the reference time-cycle signal being generated at reference time-cycle intervals; and
   transmitting the unlock signal when a button switch that transmits the unlock signal is operated, wherein
   each of the random time deviations added to the reference time-cycle signal is different from each other, each time difference between the reference time-cycle signal and the unlock signal is different from each other, and the unlock signal is transmitted from the transmitting unit at the irregular transmission timings of irregular intervals, and
   a length of a preamble which is added to the unlock signal is different between the unlock signal transmitted at the irregular transmission timings and the unlock signal transmitted when the button switch is operated.

9. The unlock method of claim 8, further comprising:
   reading an unlock code from a storage unit;
   generating the reference time-cycle signal;
   generating irregularity information; and
   adding the irregularity information to the reference time-cycle signal to add the irregularity to the unlock code read from the storage unit.

10. The unlock method of claim 8, further comprising:
    transmitting unlock signals by varying frequencies of the unlock signals.

11. An unlock program that is stored on a non-transitory computer readable medium and is executed by a computer, unlocks a lock of an apparatus in a locked state with an unlock signal, the program causing the computer to perform a method, the method comprising:
    transmitting the unlock signal at each irregular transmission timing, the irregular transmission timing being generated by adding a random time deviation to each reference time-cycle signal, the irregular transmission timing corresponding to the reference time-cycle signal, the reference time-cycle signal being generated at reference time-cycle intervals; and
    transmitting the unlock signal when a button switch that transmits the unlock signal is operated, wherein
    each of the random time deviations added to the reference time-cycle signal is different from each other, each time difference between the reference time-cycle signal and the unlock signal is different from each other, and the unlock signal is transmitted from the transmitting unit at the irregular transmission timings of irregular intervals, and a length of a preamble which is added to the unlock signal is different between the unlock signal transmitted at the irregular transmission timings and the unlock signal transmitted when the button switch is operated.

12. The unlock program of claim 11, the method further comprising:
   reading an unlock code from a storage unit;
   generating the reference time-cycle signal;
   generating irregularity information; and
   adding the irregularity information to the reference time-cycle signal to add the irregularity to the unlock code read from the storage unit.

13. A circuit device installed in an unlock device that transmits an unlock signal to an apparatus in a locked state, the circuit device comprising:
   a circuit board; and
   a button switch that transmits the unlock signal;
   a controlling unit that generates irregular transmission timings corresponding to reference time-cycle signals respectively by adding a random time deviation to each of the reference time-cycle signals, each of the reference time-cycle signals being generated at reference time-cycle intervals; and
   a transmitting unit that transmits the unlock signal at each of the irregular transmission timings and when the button switch is operated, wherein
   each of the random time deviations added to the reference time-cycle signal is different from each other, each time difference between the reference time-cycle signal and the unlock signal is different from each other, and the unlock signal is transmitted from the transmitting unit at the irregular transmission timings of irregular intervals, and
   a length of a preamble which is added to the unlock signal is different between the unlock signal transmitted at the irregular transmission timings and the unlock signal transmitted when the button switch is operated.

14. The circuit device of claim 13, further comprising on the circuit board thereof:
   a storage unit that stores an unlock code;
   a reference time-cycle generating unit that generates the reference time-cycle signal;
   an irregularity information generating unit that generates irregularity information, wherein
   the controlling unit adds the irregularity information generated from the irregularity information generating unit to the reference time-cycle signal generated from the reference time-cycle generating unit to add the irregularity to the unlock code read from the storage unit, and makes the transmitting unit transmit the unlock signal at the transmission timing with the irregularity.

15. The lock system of claim 1, further comprising:
   a storage unit that stores an unlock code, wherein
   combination of frequency channels is calculated for each unlock code, and the unlock signal including the unlock code is transmitted at varying frequencies based on the combination of the frequency channels.

16. The lock system of claim 1,
   wherein
   the preamble of the unlock signal transmitted at the irregular transmission timings has a time length corresponding to frequency synchronization of the unlocking unit and the preamble of the unlock signal transmitted when the button switch is operated has a time length over a sensing time-cycle set in the unlocking unit.

17. The lock system of claim 1,
   wherein
   the transmitting unit transmits the unlock signal correspondingly to operation of the button switch continuously.

* * * * *